United States Patent
Receveur et al.

(10) Patent No.: US 9,383,250 B2
(45) Date of Patent: Jul. 5, 2016

(54) AUTOMATIC WEIGHT OFFSET CALCULATION FOR BED SCALE SYSTEMS

(71) Applicant: Hill-Rom Services, Inc., Batesville, IN (US)

(72) Inventors: Timothy J. Receveur, Guilford, IN (US); Aziz A. Bhai, West Chester, OH (US); Gregory J. Shannon, Indianapolis, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 278 days.

(21) Appl. No.: 13/789,919

(22) Filed: Mar. 8, 2013

(65) Prior Publication Data

US 2014/0124273 A1 May 8, 2014

Related U.S. Application Data

(60) Provisional application No. 61/722,486, filed on Nov. 5, 2012.

(51) Int. Cl.
| | |
|---|---|
| *G01G 19/44* | (2006.01) |
| *A61G 7/05* | (2006.01) |
| *A61G 7/002* | (2006.01) |

(52) U.S. Cl.
CPC ............ *G01G 19/445* (2013.01); *A61G 7/05* (2013.01); *A61G 7/002* (2013.01); *A61G 2007/0527* (2013.01)

(58) Field of Classification Search
CPC ............. G01G 19/44; G01G 19/445; A61G 2007/0527; A61G 7/002; A61G 2/05
See application file for complete search history.

(56) References Cited

U.S. PATENT DOCUMENTS

| | | | |
|---|---|---|---|
| 4,539,560 A | 9/1985 | Fleck et al. | |
| 4,648,056 A * | 3/1987 | Wakefield | ................ 702/129 |
| 4,934,468 A | 6/1990 | Koerber et al. | |
| 5,276,432 A | 1/1994 | Travis | |
| 5,561,274 A * | 10/1996 | Brandorff | ................ 177/145 |
| 5,808,552 A | 9/1998 | Wiley et al. | |
| 6,067,019 A * | 5/2000 | Scott | ................ 340/573.4 |
| 6,208,250 B1 | 3/2001 | Dixon et al. | |
| 6,469,263 B1 * | 10/2002 | Johnson | ................ 177/144 |
| 6,658,680 B2 | 12/2003 | Osborne et al. | |
| 6,691,346 B2 | 2/2004 | Osborne et al. | |
| 6,957,461 B2 | 10/2005 | Osborne et al. | |
| 7,253,366 B2 | 8/2007 | Bhai | |
| 7,296,312 B2 | 11/2007 | Menkedick et al. | |
| 7,319,386 B2 | 1/2008 | Collins, Jr. et al. | |
| 7,464,605 B2 | 12/2008 | Douglas et al. | |

(Continued)

OTHER PUBLICATIONS

Omega Brochure; "Introduction to Load Cells" downloaded Jun. 11, 2015.*

*Primary Examiner* — Peter Macchiarolo
*Assistant Examiner* — Natalie Huls
(74) *Attorney, Agent, or Firm* — Barnes & Thornburg LLP

(57) ABSTRACT

A patient support apparatus includes load cells and a controller operable to automatically update a weight offset for use in determining a true patient weight. The controller is configured to receive signals produced by the load cells, determine whether a patient is being supported by a patient support surface of the patient support apparatus, detect movement on the patient support surface, determine a weight of the patient being supported on the patient support surface, determine whether a patient is no longer being supported by the patient support surface, and update a weight offset.

31 Claims, 8 Drawing Sheets

(56) References Cited

U.S. PATENT DOCUMENTS

| | | | |
|---|---|---|---|
| 2005/0172405 A1* | 8/2005 | Menkedick et al. | 5/618 |
| 2006/0028350 A1* | 2/2006 | Bhai | 340/666 |
| 2008/0172789 A1* | 7/2008 | Elliot et al. | 5/616 |
| 2008/0289108 A1* | 11/2008 | Menkedick et al. | 5/610 |
| 2009/0051549 A1* | 2/2009 | Tochigi et al. | 340/573.4 |
| 2011/0208541 A1* | 8/2011 | Wilson et al. | 705/3 |
| 2012/0078573 A1* | 3/2012 | Kazuno et al. | 702/173 |
| 2012/0089419 A1* | 4/2012 | Huster et al. | 705/3 |
| 2012/0259248 A1* | 10/2012 | Receveur | 600/595 |
| 2013/0246088 A1* | 9/2013 | Huster et al. | 705/2 |
| 2014/0138164 A1* | 5/2014 | Khanuja | 177/1 |
| 2014/0266733 A1* | 9/2014 | Hayes et al. | 340/573.4 |

* cited by examiner

AUTOMATIC WEIGHT OFFSET CALCULATION FOR BED SCALE SYSTEMS

This application claims priority under 35 U.S.C. §119(e) to U.S. Provisional Application Ser. No. 61/722,486, filed Nov. 5, 2012, which is expressly incorporated by reference herein.

BACKGROUND

The present disclosure is related to a patient support apparatus that includes a control system for automatically calculating a weight offset for a scale system integrated into the patient support apparatus. More specifically, the present disclosure is directed to a patient support apparatus having a control system that gathers information regarding loads placed upon the patient support apparatus, determines whether non-patient loads have been placed upon the patient support apparatus, and automatically updates a weight offset to compensate for the non-patient loads placed upon the patient support apparatus.

Often, when a patient is in a care facility such as a hospital, the patient is placed on a patient support apparatus. Patients who are positioned on the patient support apparatus for extended periods have an increased risk of developing certain complications or injuries. For example, patients who are positioned on the patient support apparatus for an extended period of time may develop pressure ulcers. Various factors may result in a compromised skin condition that increases the potential of these nosocomial pressure ulcers occurring. In an effort to mitigate or prevent such complications and injuries, some patient support apparatuses use load information gathered from an integrated scale system to derive pressure set points for a dynamic support surface, which continually redistributes the pressure of the dynamic support surface against the patient's skin. Patient support apparatuses known in the art, however, do not make a distinction between loads that are attributable to the actual weight of the patient and loads that are attributable to the weight of non-patient items placed on the patient support apparatus such as, for example, medical equipment, personal effects, blankets, mechanical items, etc. As a result, the weight attributable to non-patient loads often causes errors in calculating the true weight of the patient, which in turn can lead to non-optimal pressure set points being derived for dynamic support surfaces.

In addition, caregivers often monitor the weight of a patient who is in a care facility to diagnose and treat certain medical conditions. For example, some caregivers closely monitor a patient's weight (e.g., weight loss or weight gain) throughout a course of treatment to determine, for example, whether the patient is retaining water. To facilitate making those determinations, some caregivers use an amount of weight calculated by the patient support apparatus upon which the patient is being supported. As discussed above, patient support apparatuses known in the art, however, do not make a distinction between loads that are attributable to the actual weight of the patient and loads that are attributable to the weight of non-patient items placed on the patient support apparatus. As a result, the weight attributable to non-patient loads may also cause the caregiver to incorrectly diagnose or treat certain medical conditions.

SUMMARY

The present application discloses one or more of the features recited in the appended claims and/or the following features which, alone or in any combination, may comprise patentable subject matter:

According to one aspect of the present disclosure, a patient support apparatus includes a patient support, a plurality of load cells, and a controller. The plurality of load cells supports the patient support. Each load cell is configured to produce a signal indicative of an amount of weight on that load cell. The controller is in communication with the plurality of load cells. The controller is configured to receive the signal produced by each of the plurality of load cells, determine whether the patient support is supporting a patient as a function of the signals produced by the plurality of load cells, detect movement on the patient support in response to determining that the patient support is supporting the patient, and determine a weight of the patient being supported on the patient support. The controller is further configured to determine, subsequent to determining the weight of the patient, whether the patient support is no longer supporting the patient, and to update a weight offset in response to determining that the patient support is no longer supporting the patient.

In some embodiments, determining whether the patient support is supporting the patient includes determining a current occupancy state of the patient support apparatus.

In some embodiments, the current occupancy state of the patient support apparatus includes at least one of an occupied state and an unoccupied state. The occupied state is indicated when the patient support is determined to be supporting the patient and the unoccupied state is indicated when the patient support is determined not to be supporting the patient.

In some embodiments, the controller is further configured to set an initial occupancy state of the patient support apparatus to the unoccupied state and determine a normalized amount of weight on the plurality of load cells as a function of the signals produced by the plurality of load cells. The controller is further configured to set the current occupancy state of the patient support apparatus to the occupied state in response to the normalized amount of weight on the plurality of load cells satisfying an occupied condition. The occupied condition defines a first normalized threshold value for which the normalized amount of weight on the plurality of load cells must exceed. The controller may further be configured to set the current occupancy state of the patient support apparatus to the unoccupied state in response to the normalized amount of weight on the plurality of load cells satisfying an unoccupied condition. The unoccupied condition defines a second normalized threshold value for which the normalized amount of weight on the plurality of load cells must be below.

In some embodiments, the first normalized threshold value is 31 pounds and the second normalized threshold value is 65 pounds.

In some embodiments, the normalized amount of weight on the plurality of load cells includes a current total amount of weight on the plurality of load cells being compensated for a first amount of weight and a second amount of weight. The first amount of weight corresponds to the weight of the patient support apparatus at the time of manufacture and the second amount of weight corresponds to the weight of non-patient items placed on the patient support apparatus.

In some embodiments, the patient support apparatus further includes a timer module in communication with the controller. The timer module is configured to increment one or more timer values for the controller.

In some embodiments, the controller is further configured to start a patient presence timer in response to determining that the patient support is supporting the patient, determine whether a current value of the patient presence timer is at least one of greater than or equal to a reference presence timer threshold, and start a stability timer in response to (i) determining that the current value of the patient presence timer is at least one of greater than or equal to the reference presence timer threshold, and (ii) not detecting movement on the patient support. The controller is further configured to determine whether a current value of the stability timer is at least one of greater than or equal to a reference stability timer threshold and store the weight of the patient being supported on the patient support in a memory.

In some embodiments, the reference presence timer threshold is 30 minutes and the reference stability timer threshold is 2 minutes.

In some embodiments, the controller is configured to determine, in response to determining that the patient support is no longer supporting the patient, an empty weight of the patient support apparatus as a function of signals received from the plurality of load sensors. The controller may further be configured to determine whether a normalized empty weight of the patient support apparatus is at least one of greater than or equal to a reference minimum weight threshold, determine whether the normalized empty weight is at least one of less than or equal to a reference maximum weight threshold, determine whether the empty weight is less than the weight of the patient reduced by a reference reduction percentage and determine whether historical empty weight data is stored in memory of the patient support apparatus.

In some embodiments, the empty weight of the patient support apparatus includes a current total amount of weight on the plurality of load cells being compensated for a first amount of weight and a second amount of weight. The first amount of weight corresponds to the weight of the patient support apparatus at the time of manufacture and the second amount of weight corresponds to the weight of non-patient items placed on the patient support apparatus.

In some embodiments, the normalized empty weight of the patient support apparatus includes the current total amount of weight on the plurality of load cells being compensated only for the first amount of weight.

In some embodiments, the reference minimum weight threshold is minus 30 pounds, the reference maximum weight threshold is plus 30 pounds, and the reference reduction percentage is 75 percent.

In some embodiments, updating a weight offset in response to determining that the patient support is no longer supporting the patient includes updating the weight offset in response to (i) determining that historical empty weight data is not stored in the memory, (ii) determining that the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

In some embodiments, the controller is configured to store the empty weight in the memory of the patient support apparatus, compare the empty weight to the historical empty weight data in response to determining that historical empty weight data is stored in the memory, and determine whether the empty weight is consistent with the historical empty weight data. The controller may further be configured to increment an empty weight counter in response to determining that the empty weight is consistent with the historical empty weight data and determine whether a current empty weight counter value is at least one of greater than or equal to an empty weight counter threshold.

In some embodiments, updating a weight offset in response to determining that the patient support is no longer supporting the patient includes updating the weight offset in response to determining that the current empty weight counter value is at least one of greater than or equal to the empty weight counter threshold.

In a second aspect of the preset disclosure, a method for determining a weight offset includes the step of receiving, on a controller of a patient support apparatus, a signal produced by each of a plurality of load cells supporting a patient support, the signal produced by each load cell indicating an amount of weight on that load cell. The method further includes the step of determining, on the controller, whether the patient support of the patient support apparatus is supporting a patient as a function of the signals produced by the plurality of load cells. The method further includes the steps of detecting, on the controller, movement on the patient support in response to determining that the patient support is supporting the patient, and determining, on the controller, a weight of the patient being supported on the patient support. The method further includes the steps of determining, on the controller, subsequent to determining the weight of the patient, whether the patient support is no longer supporting the patient, and updating, on the controller, a weight offset in response to determining that the patient support is no longer supporting the patient.

In some embodiments, determining whether the patient support of the patient support apparatus is supporting the patient comprises determining a current occupancy state of the patient support apparatus. The current occupancy state of the patient support apparatus comprises at least one of an occupied state and an unoccupied state. The occupied state is indicated when the patient support is determined to be supporting the patient and the unoccupied state is indicated when the patient support is determined not to be supporting the patient.

In some embodiments, the method further comprises setting, on the controller, an initial occupancy state of the patient support apparatus to the unoccupied state. The method may also further include determining, on the controller, a normalized amount of weight on the plurality of load cells as a function of the signals produced by the plurality of load cells. The method may still further include setting, on the controller, the current occupancy state of the patient support apparatus to the occupied state in response to the normalized amount of weight on the plurality of load cells satisfying an occupied condition, the occupied condition defining a first normalized threshold value for which the normalized amount of weight on the plurality of load cells must exceed. The method may still yet include setting, on the controller, the current occupancy state of the patient support apparatus to the unoccupied state in response to the normalized amount of weight on the plurality of load cells satisfying an unoccupied condition, the unoccupied condition defining a second normalized threshold value for which the normalized amount of weight on the plurality of load cells must be below.

In some embodiments, the normalized amount of weight on the plurality of load cells comprises a current total amount of weight on the plurality of load cells being compensated for by a first amount of weight and a second amount of weight, the first amount of weight corresponding to the weight of the patient support apparatus at the time of manufacture, and the second amount of weight corresponding to the weight of non-patient items placed on the patient support apparatus.

In some embodiments, the method may further comprise starting, on the controller, a patient presence timer in response to determining that the patient support is supporting the patient. The method may also include determining, on the controller, whether a current value of the patient presence timer is at least one of greater than or equal to a reference presence timer threshold. The method may still yet include starting, on the controller, a stability timer in response to (i) determining that the current value of the patient presence timer is at least one of greater than or equal to the reference presence timer threshold, and (ii) not detecting movement on the patient support. The method may yet also include determining, on the controller, whether a current value of the stability timer is at least one of greater than or equal to a reference stability timer threshold. The method may still yet include storing the weight of the patient being supported on the patient support in a memory.

In some embodiments, the method further comprises determining, on the controller, an empty weight of the patient support apparatus as a function of signals received from the plurality of load sensors in response to determining that the patient support is no longer supporting the patient. The method may also include determining, on the controller, whether a normalized empty weight of the patient support apparatus is at least one of greater than or equal to a reference minimum weight threshold. The method may yet include determining, on the controller, whether the normalized empty weight is at least one of less than or equal to a reference maximum weight threshold. The method may still yet include determining, on the controller, whether the empty weight is less than the weight of the patient reduced by a reference reduction percentage. The method may still further include determining, on the controller, whether historical empty weight data is stored in memory of the patient support apparatus.

In some embodiments, the empty weight of the patient support apparatus comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus. The normalized empty weight of the patient support apparatus may comprise the current total amount of weight on the plurality of load cells being compensated only for the first amount of weight.

In some embodiments, updating a weight offset in response to determining that the patient support is no longer supporting the patient comprises updating the weight offset in response to (i) determining that historical empty weight data is not stored in the memory; (ii) determining that the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

In some embodiments, the method further includes storing the empty weight in the memory of the patient support apparatus. The method may still further include comparing, on the controller, the empty weight to the historical empty weight data in response to determining that historical empty weight data is stored in the memory. The method may yet further include determining, on the controller, whether the empty weight is consistent with the historical empty weight data. The method may still further include incrementing, on the controller, an empty weight counter in response to determining that the empty weight is consistent with the historical empty weight data. The method may still yet include determining, on the controller, whether a current empty weight counter value is at least one of greater than or equal to an empty weight counter threshold. Updating a weight offset in response to determining that the patient support is no longer supporting the patient may comprise updating the weight offset in response to determining that the current empty weight counter value is at least one of greater than or equal to the empty weight counter threshold.

In a third aspect of the present disclosure, a patient support apparatus includes a processor and at least one machine-readable storage medium. The at least one machine-readable storage medium includes a plurality of instructions, that in response to being executed by the processor, result in the patient support apparatus receiving, a signal produced by each of a plurality of load cells supporting a patient support of the patient support apparatus, the signal produced by each load cell indicating an amount of weight on that load cell. The at least one machine-readable storage medium further includes a plurality of instructions, that in response to being executed by the processor, result in the patient support apparatus determining whether the patient support of the patient support apparatus is supporting a patient as a function of the signals produced by the plurality of load cells, detecting movement on the patient support in response to determining that the patient support is supporting the patient, determining a weight of the patient being supported on the patient support, determining, subsequent to determining the weight of the patient, whether the patient support is no longer supporting the patient, and updating a weight offset in response to determining that the patient support is no longer supporting the patient.

In some embodiments, determining whether the patient support of the patient support apparatus is supporting the patient comprises determining a current occupancy state of the patient support apparatus. The current occupancy state of the patient support apparatus comprises at least one of an occupied state and an unoccupied state. The occupied state is indicated when the patient support is determined to be supporting the patient. The unoccupied state is indicated when the patient support is determined not to be supporting the patient.

In some embodiments, the at least one machine-readable storage medium further comprises instructions, that in response to being executed by the processor, may result in the patient support apparatus starting a patient presence timer in response to determining that the patient support is supporting the patient. The instructions, when executed by the processor may result in determining whether a current value of the patient presence timer is at least one of greater than or equal to a reference presence timer threshold. The instructions, when executed by the processor may result in starting a stability timer in response to (i) determining that the current value of the patient presence timer is at least one of greater than or equal to the reference presence timer threshold, and (ii) not detecting movement on the patient support. The instructions, when executed by the processor may result in determining whether a current value of the stability timer is at least one of greater than or equal to a reference stability timer threshold. The instructions, when executed by the processor may result in storing the weight of the patient being supported on the patient support in a memory.

In some embodiments, the at least one machine-readable storage medium further comprises instructions, that in response to being executed by the processor, may result in the patient support apparatus determining an empty weight of the patient support apparatus as a function of signals received from the plurality of load sensors in response to determining that the patient support is no longer supporting the patient. The instructions, when executed by the processor may result in determining whether a normalized empty weight of the patient support apparatus is at least one of greater than or equal to a reference minimum weight threshold. The instructions, when executed by the processor may result in determining whether the normalized empty weight is at least one of less than or equal to a reference maximum weight threshold. The instructions, when executed by the processor may result in determining whether the empty weight is less than the weight of the patient reduced by a reference reduction percentage. The instructions, when executed by the processor may result in determining whether historical empty weight data is stored in memory of the patient support apparatus.

In some embodiments, updating a weight offset in response to determining that the patient support is no longer supporting the patient comprises updating the weight offset in response to (i) determining that historical empty weight data is not stored in the memory; (ii) determining that the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

In some embodiments, the at least one machine-readable storage medium further comprises instructions, that in response to being executed by the processor, may result in the patient support apparatus storing the empty weight in the memory of the patient support apparatus. The instructions, when executed by the processor may result in comparing the empty weight to the historical empty weight data in response to determining that historical empty weight data is stored in the memory. The instructions, when executed by the processor may result in determining whether the empty weight is consistent with the historical empty weight data. The instructions, when executed by the processor may result in incrementing an empty weight counter in response to determining that the empty weight is consistent with the historical empty weight data. The instructions, when executed by the processor may result in determining whether a current empty weight counter value is at least one of greater than or equal to an empty weight counter threshold. Updating a weight offset in response to determining that the patient support is no longer supporting the patient may comprise updating the weight offset in response to determining that the current empty weight counter value is at least one of greater than or equal to the empty weight counter threshold.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
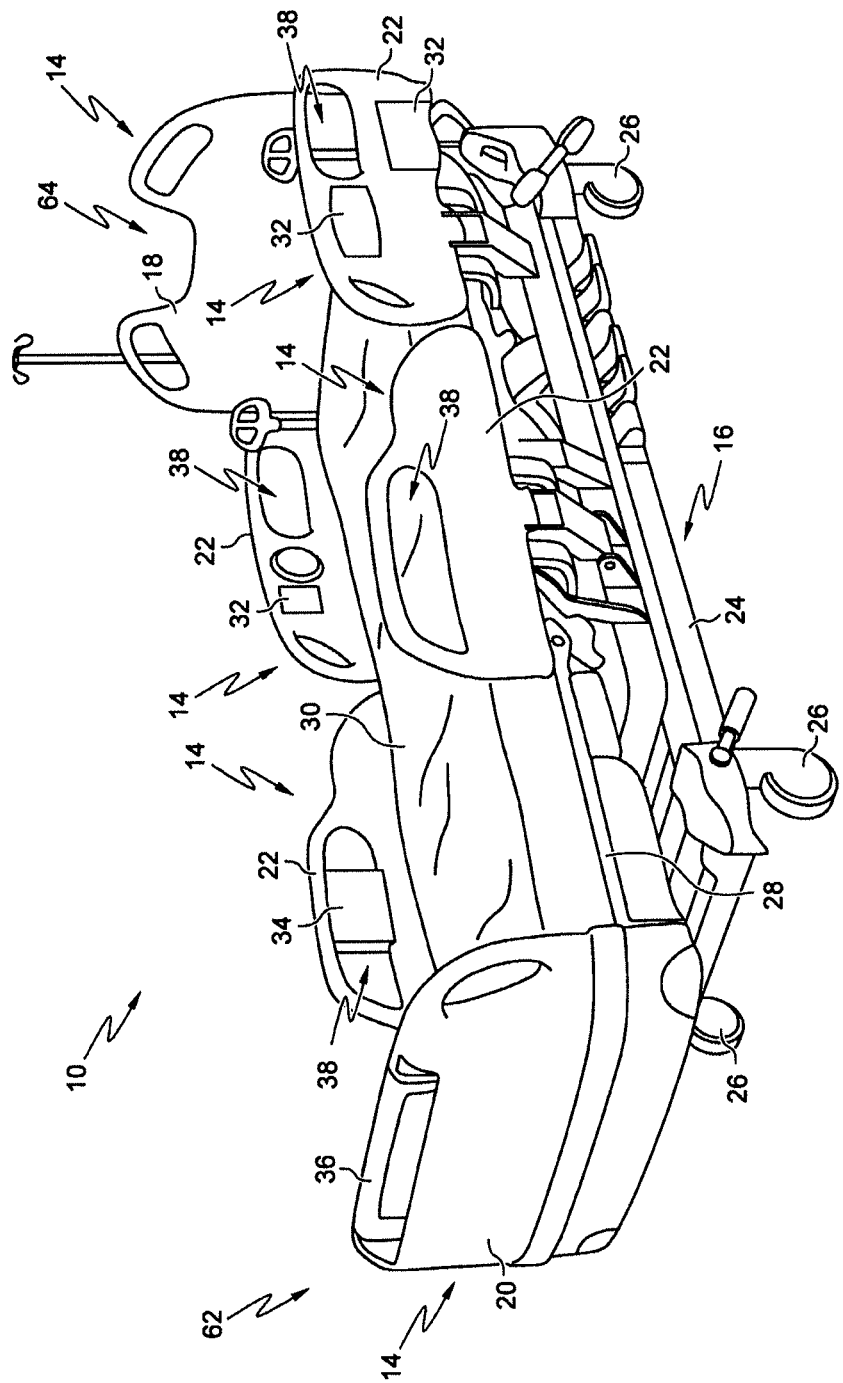
FIG. 1 is a perspective view of a patient support apparatus.
Figure 3:
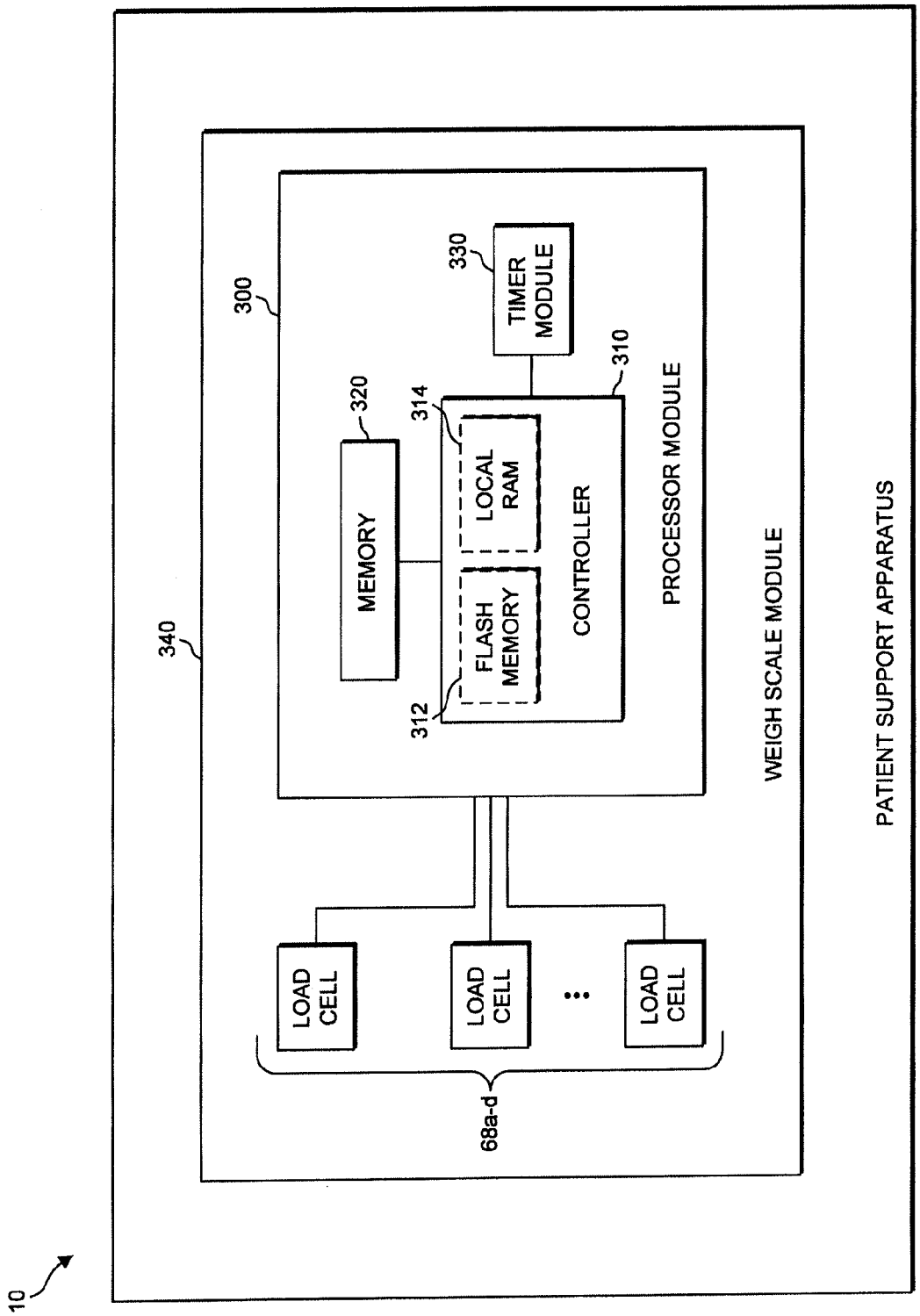
FIG. 3 is a block diagram showing basic components of the patient support apparatus of FIG. 1 for determining an offset weight to compensate for non-patient loads.

According to this disclosure, a patient support apparatus 10, shown in FIG. 1, includes a controller, shown diagrammatically in FIG. 3, which automatically updates a weight offset for use in determining a true patient weight. That is, the patient support apparatus 10 of FIG. 1 has an auto-tare function or feature, which detects and compensates for non-patient loads placed on the patient support apparatus 10 that affect determination of the true patient weight. While the auto-tare feature disclosed herein may be implemented on any type of patient support apparatus having a controller and a scale system, illustrative patient support apparatus 10, as shown in FIG. 1, is a VersaCare® bed available from Hill-Rom Company, Inc. As such, the details of the patient support apparatus 10 can be found, in large part, in U.S. Pat. Nos. 6,658,680; 6,691,346; 6,957,461; 7,253,366; and 7,296,312, each of which is hereby incorporated by reference.

The patient support apparatus 10 has a number of barriers 14 coupled to a bed frame 16 as shown in FIG. 1. The barriers 14 include a headboard 18, a footboard 20, and siderails 22. The bed frame 16 includes a base frame 24 with casters 26 and the siderails 22 are coupled an upper frame 28. The upper frame 28 includes a number of mattress support sections that support a mattress 30. In FIG. 1, all of the siderails 22 are shown in a raised position. However, each siderail 22 is movable between the raised position and a lowered position. Thus, the bed frame 16 or the mattress 30 or both serves as a patient support structure of the patient support apparatus 10. The term "patient support structure" as used in the claims is intended to cover all types of mattresses and/or bed frames, including bariatric mattresses or bed frames. Typically, a mattress or support surface, such as mattress 30, is present when the patient support apparatus 10 is used to support patients, but the mattress and frames may be sold separately.

The illustrative patient support apparatus 10 has a number of user input panels or control panels, including user input panels 32 that are affixed to the siderails 22 closest to the head end of the patient support apparatus 10, a hand-held pendant or pod 34 removably coupled to one of the siderails 22 closest to the foot end of the patient support apparatus 10, and another user input panel 36 coupled to the footboard 20. The pendant 34 is configured to snap into openings 38 provided in each siderail 22. The pendant 34 can be detached from each siderail 22 and held by a patient or caregiver during use. The user input panel 36 is movable between a storage position, shown in FIG. 1, and a use position by pulling the user input panel 36 upwardly relative to the footboard 20.

Figure 2:
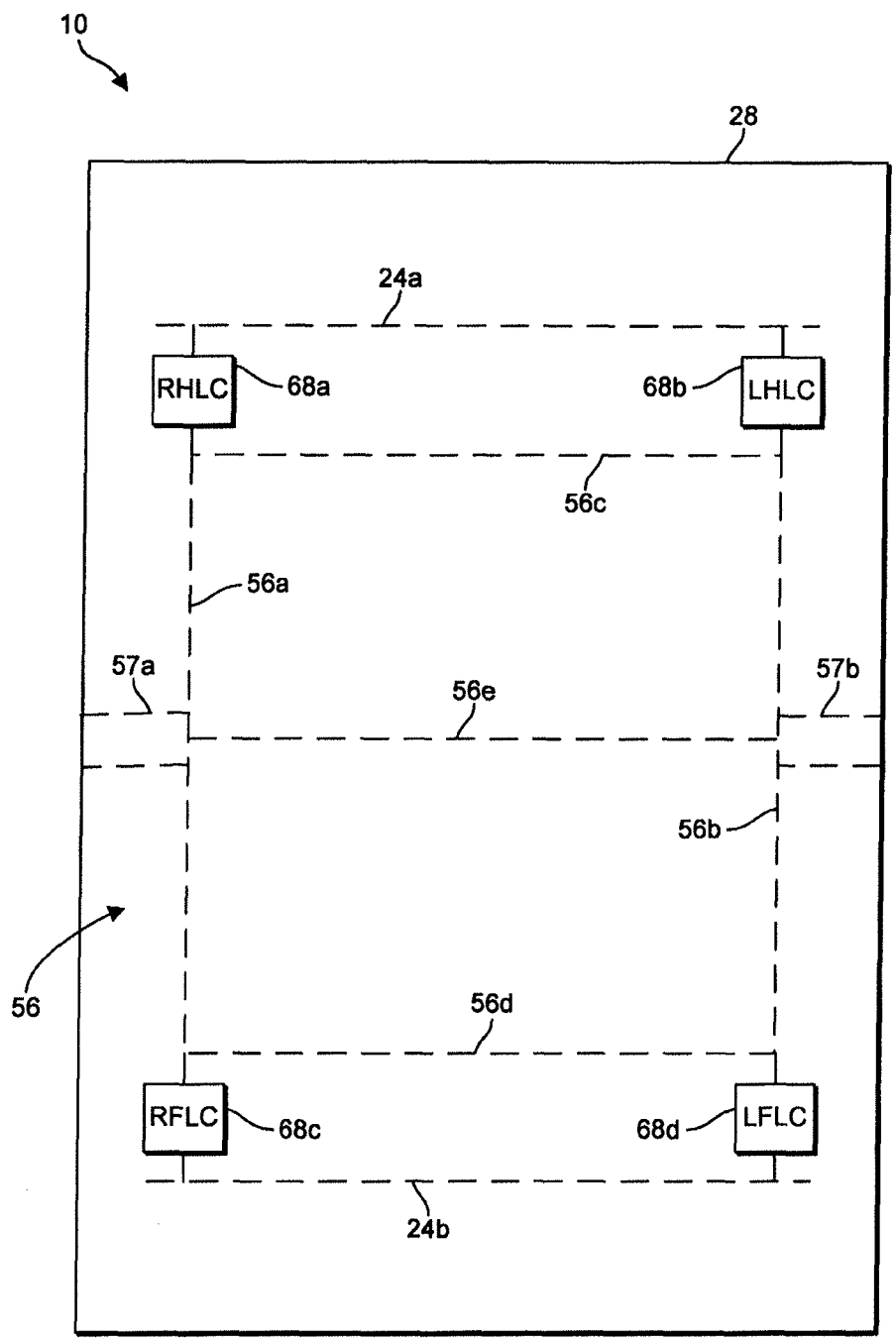
FIG. 2 is a block diagram illustrating exemplary locations of a number of load cells relative to the patient support apparatus of FIG. 1.

As shown in FIG. 2, the base frame 24 is supports a weigh frame 56 that is mounted via frame members 57a and 57b to the upper frame 28 configured to support the mattress 30. A number of load cells 68a-d are positioned between the weigh frame 56 and the base frame 24, wherein each load cell 68a-d is configured to produce a signal indicative of a weight supported by that load cell 68a-d from the weigh frame 56 relative to the base frame 24. In the illustrated embodiment, four such load cells are positioned between the weigh frame 56 and the base frame 24; one each near a different corner of the patient support apparatus 10. Some of the structural components of the patient support apparatus 10 will be designated hereinafter as "right", "left", "head" and "foot" from the reference point of an individual lying on the individual's back on a support surface of the mattress 30 with the individual's head oriented toward a head end 62 (as shown in FIG. 1) of the patient support apparatus 10 and the individual's feet oriented toward a foot end 64 (as shown in FIG. 1) of the patient support apparatus 10. For example, the weigh frame 56 illustrated in FIG. 2 includes a head end frame member 56c mounted at one end to one end of a right side weigh frame member 56a and at an opposite end to one end of a left side frame member 56b. Opposite ends of the right side weigh frame member 56a and the left side weigh frame member 56b are mounted to a foot end frame member 56d. A middle weigh frame member 56e is mounted at opposite ends to the right and left side weigh frame members 56a and 56b respectively between the head end and foot end frame members 56c and 56d. The frame member 57a is shown mounted between the right side frame member 56a and the upper frame 28, and the frame member 57b is shown mounted between the left side frame member 56b and the upper frame 28. It will be understood that other structural support is provided between the weigh frame member 56 and the upper frame 28, although only the frame members 57a and 57b are shown in FIG. 2 for ease of illustration.

A right head load cell (RHLC) 68a is illustratively positioned near the right head end of the patient support apparatus 10 between a base support frame 24a secured to the base frame 24 near the head end 62 of the bed and the junction of the head end frame member 56c and the right side frame member 56a, as shown in FIG. 2. A left head load cell (LHLC) 68b is illustratively positioned near the left head end of the patient support apparatus 10 between the base support frame 24a and the junction of the head end frame member 56c and the left side frame member 56b. A right foot load cell (RFLC) 68c is illustratively positioned near the right foot end of the patient support apparatus 10 between a base support frame 24b secured to the base frame 24 near the foot end 64 of the patient support apparatus 10 and the junction of the foot end frame member 56d and the right side frame member 56a. A left foot load cell (LFLC) 68d is illustratively positioned near the left foot end of the patient support apparatus 10 between the base support frame 24b and the junction of the foot end frame member 56d and the left side frame member 56b. It should be noted that in the embodiment illustrated in FIG. 2, the four corners of the upper frame 28 are shown extending beyond the four corners of the weigh frame 56, and hence beyond the positions of the four load cells 68a-68d. Additionally, it should be appreciated that signals from the load cells 68a-68d are also used by a weigh scale system (e.g., the weigh scale module 340 illustratively shown in FIG. 3) of the patient support apparatus 10 to calculate patient weight.

In the illustrated embodiment, each of the load cells 68a-d are weight sensors of the type having resistive strain gauges coupled to a deflectable block (not shown), and structurally couple the weigh frame 56 to the base frame 24. It will be appreciated, however, that other weight detection devices may alternatively be used, wherein such alternative devices may be or include, but are not limited to, linear variable displacement transducers (LVDTs) and/or other weight detection devices operable in accordance with known capacitive, inductive, or other physical principles. For example, other weight detection devices that can be used may include those described in U.S. Pat. Nos. 7,296,312; 7,464,605; 6,208,250; 5,808,552; and 4,539,560, each of which is hereby incorporated by reference. However, all such alternative weight detection devices are contemplated by this disclosure.

In one illustrative embodiment shown in FIG. 3, the patient support apparatus 10 includes a weigh scale module 340 configured to automatically update a weight offset for use in determining a true patient weight. The weigh scale module 340 includes a processor module 300 that is in communication with each of the load cells 68a-d. The processor module 300 includes a microprocessor-based controller 310 having a flash memory unit 312 and a local random-access memory (RAM) unit 314. The local RAM unit 314 is utilized by the controller 310 to temporarily store information corresponding to features and functions provided by the patient support apparatus 10. The processor module 300 further includes an auxiliary memory unit 320, which may be an electrically erasable programmable read-only memory (EEPROM) or other conventional memory unit that is electrically connected to the controller 310. It should be appreciated that although the weigh scale module 340 includes the processor module 310 in the present embodiment, the processor module 300 may be embodied as a separate component or embedded within any other component of the patient support apparatus 10 in other embodiments.

The processor module 300 also includes a timer module 330 in communication with the controller 310. In one embodiment, the timer module 330 is configured to facilitate the controller 310 in keeping track of an amount of time that has passed since the occurrence of a particular event such as, for example, the initialization of a timer. To do so, the timer module 330 utilizes any number of timers, clock signals, counters, algorithms, or any other component of the patient support apparatus 10 suitable for determining the passage of time. In one embodiment, the timer module 330 determines an amount of time that has passed (e.g., counting up) since the occurrence of a particular event such as, for example, the initialization of a timer. In another embodiment, the timer module 330 determines an amount of time remaining (e.g., counting down) until the occurrence of an event such as, for example, the expiration of a reference countdown timer.

Figure 4:
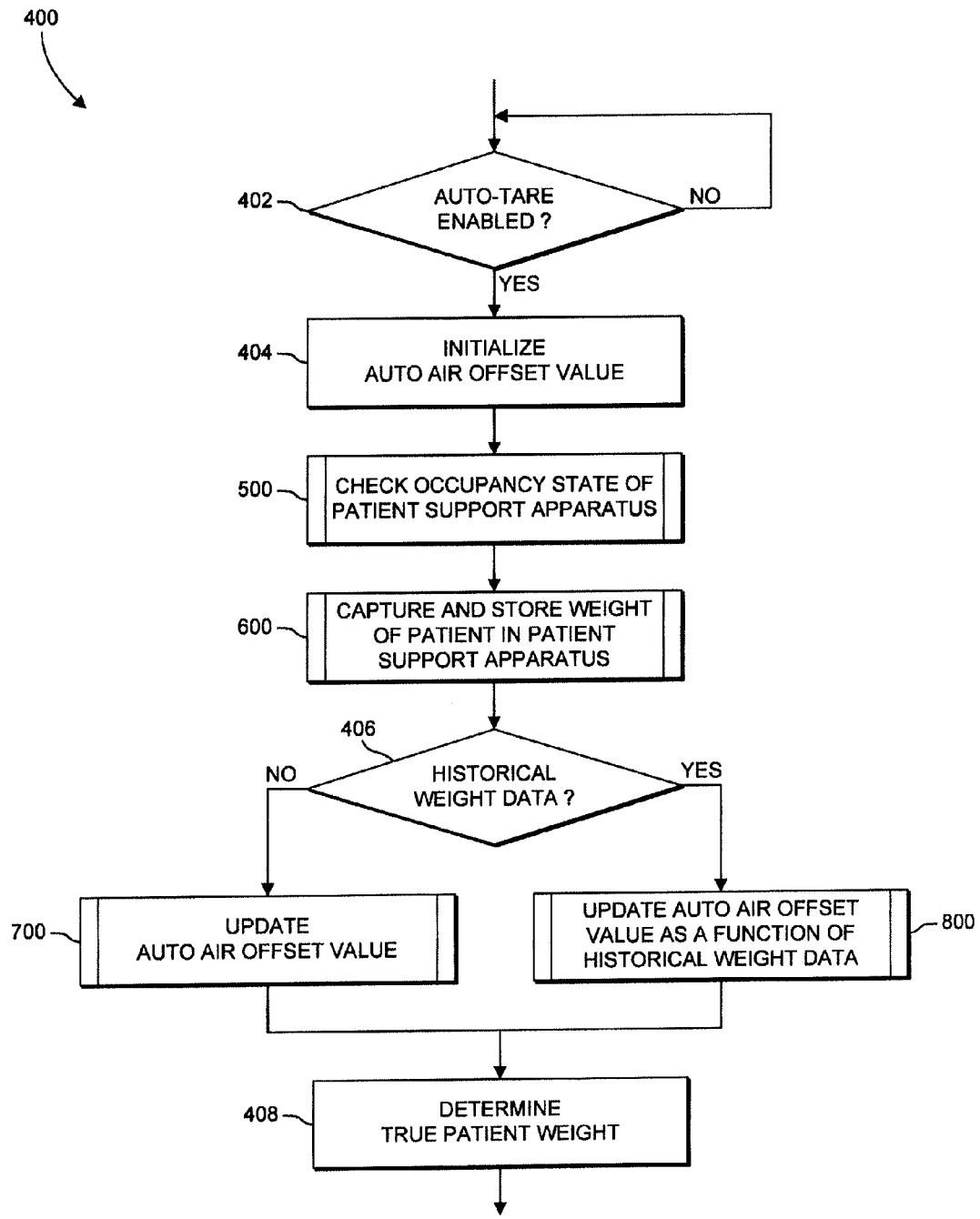
FIG. 4 is a flow chart of an illustrative control routine that may be executed by the patient support apparatus of FIG. 1 for determining an offset weight to compensate for non-patient loads.

In the illustrated embodiment, the flash memory 312 of the processor module 300 includes a number of software control routines and other data that are executable by the controller 310 to automatically update a weight offset for use in determining a true patient weight. An illustrative main software control routine 400 for managing such functions is illustrated in FIG. 4 in the form of a flowchart. The software control routine 400 is executed periodically by the controller 310, e.g., upon patient exit, to automatically update the weight offset (e.g., the amount of weight of attributable to non-patient items placed on the patient support apparatus 10), which is used in determining the true weight of the patient. In one embodiment, the true patient weight (TPW) is calculated by the controller 310 according to the following generalized equation:

$$TPW = \Sigma(\text{Load Cells}) - AO - AAO \qquad \text{Equation (1)}$$

where: Σ(Load Cells) is the sum of the amount of weight sensed by each of the load cells 68a-d; AO or "Air Offset" is the known weight on the patient support apparatus 10 at the time of manufacture (e.g., the weight of the weigh frame 56, the weight of the mattress 30, etc.); and AAO or "Auto Air Offset" is the amount of weight placed on the weigh frame 56 not attributable to the weight of the patient or the AO. It should be understood that upon initial execution of the software control routine 400, the controller 310 may configure a default value for the AAO such as, for example, a zero value.

Referring back to FIG. 4, the software control routine 400 begins at decision step 402 where the controller 310 is operable to determine whether auto-tare functionality has been enabled on the patient support apparatus 10. In some embodiments, the auto-tare functionality may be enabled and disabled using the user input panels 32 affixed to the side rails 22, the user input panel 36 coupled to the footboard 20, or the detachable pendant 34 configured to snap into the openings 38 provided in each siderail 22. If, at decision step 402, the controller 310 determines that auto-tare functionality has been enabled on the patient support apparatus 10, the control routine 400 advances to step 404. If, however, the controller 310 instead determines at decision step 402 that auto-tare functionality has not been enabled, the control routine 400 restarts and the controller 310 continues determining whether auto-tare functionality has been enabled.

At step 404, the controller 310 initializes the Auto Air Offset (AAO) value. As described above, the controller 310 automatically updates a weight offset (e.g., the AAO) for use in determining a true patient weight. The weight corresponding to the AAO is the amount of weight placed on the weigh frame 56 attributable to non-patient loads. Such non-patient weight causes errors in calculating the true weight of the patient and, as a result, leads to non-optimal pressure set points being derived for dynamic support surfaces or an incorrect evaluation of a change in the patient's weight. In one embodiment, the controller 310 configures a default value for the AAO such as, for example, a zero value. In such embodiments, the controller 310 may configure the default value for the AAO according to the following generalized equation:

$$AAO = K \qquad \text{Equation (2)}$$

where: K is a predefined constant, including, for example, a zero value. After initializing the AAO value, the control routine 400 advances to step 500.

At step 500, the controller 310 checks an occupancy state of the patient support apparatus 10. For example, in one embodiment, the controller 310 determines whether a patient is "in" or "out" the patient support apparatus 10 (e.g., whether or not the patient is being supported by a support surface of the mattress 30). After checking the occupancy state of the patient support apparatus 10, the control routine 400 advances to step 600.

At step 600, the controller 310 captures and stores the weight of the patient in the patient support apparatus 10. To do so, the controller 310 receives a signal from each of the load cells 68a-d and determines a total amount of weight on the weigh frame 56. The controller 310 then adjusts the total amount of weight on the weigh frame 56 by the AO and AAO to determine a total occupied patient weight. In such embodiments, the total occupied patient weight (TOPW) is calculated by the controller 310 according to the following generalized equation:

$$TOPW = \Sigma(\text{Load Cells}) - AO - AAO \qquad \text{Equation (3)}$$

where: Σ(Load Cells) is the sum of the amount of weight sensed by each of the load cells 68a-d when the patient is occupying the patient support apparatus 10; AO is the known weight on the patient support apparatus 10 at the time of manufacture (e.g., the weight of the weigh frame 56, the weight of the mattress 30, etc.); and AAO is the amount of weight placed on the weigh frame 56 not attributable to the weight of the patient or the AO. It should be understood that upon initial execution of the software control routine 400, the controller 310 may configure a default value for the AAO such as, for example, a zero value. After determining the TOPW, the controller 310 may save the value corresponding to the TOPW to the auxiliary memory unit 320. The control routine 400 then advances to decision step 406.

At decision step 406, the controller 310 determines whether historical weight data exists. For example, in one embodiment, the controller 310 determines whether historical weight data corresponding to the patient support apparatus 10 exists. If, at decision step 406, the controller 310 determines that historical weight data for the patient support apparatus 10 exists, then the control routine 400 advances to step 800 in which the controller 310 updates the Auto Air Offset (AAO) value as a function of the historical weight data. If, however, the controller 310 instead determines at decision step 406 that historical weight data for the patient support apparatus 10 does not exist, then the control routine 400 advances to step 700 in which the controller 310 updates the AAO value without using historical weight data. After updating the AAO value in step 700 or step 800, the control routine 400 advances to step 408.

At step 408, the controller 310 determines the true weight of the patient. That is, the controller 310 determines the amount of weight on the patient support apparatus 10 which is only attributable to the patient and not that which is attributable to non-patient loads. To do so, the controller 310 calculates the true patient weight (TPW) using a generalized equation such as, for example, Equation (1) above. To compensate for new amounts of weight placed on the patient support apparatus 10 that are attributable to non-patient loads, the controller 310 uses the updated AAO value in calculating the TPW.

As discussed above, patient support apparatuses known in the art do not make a distinction between loads that are attributable to the actual weight of the patient and loads that are attributable to the weight of non-patient items placed on the patient support apparatus such as, for example, medical equipment, personal effects, blankets, mechanical items, etc. Such non-patient weight causes errors in calculating the true weight of the patient and, as a result, leads to non-optimal pressure set points being derived for dynamic support surfaces or an incorrect evaluation of a change in the patient's weight. As a result, patient support apparatuses known in the art typically require a caregiver to manually set a weight offset to account for non-patient loads each time such loads are placed on or removed from the patient support apparatus. By automatically updating the AAO value and calculating a true patient weight, the controller 310 of the present embodiment eliminates the need for caregivers to manually set a weight offset each time a non-patient load is placed on or removed from the patient support apparatus 10.

Figure 5:
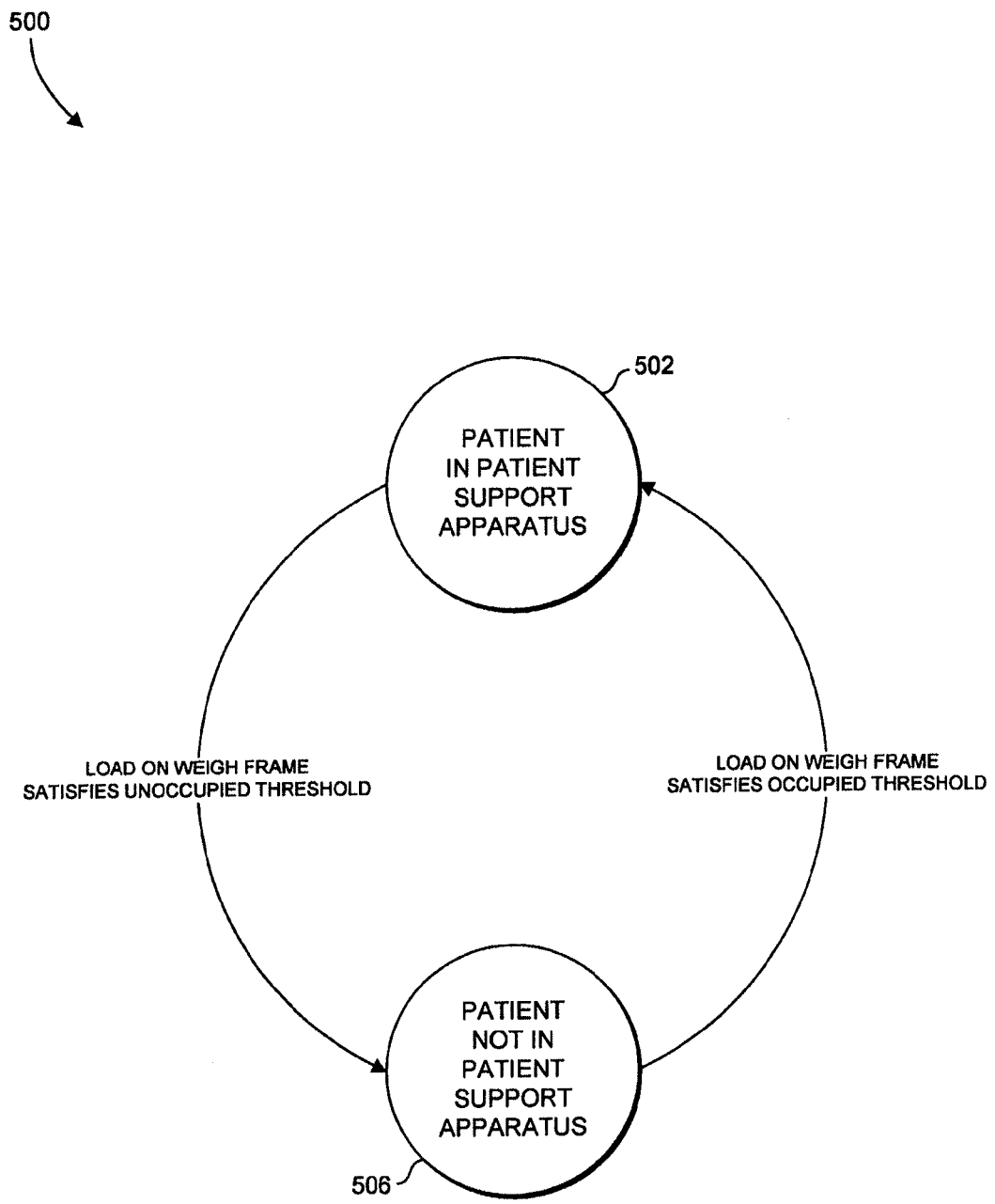
FIG. 5 is a state diagram illustrating one embodiment of a control sub-routine for determining whether a patient is being supported by the patient supported apparatus that forms one part of the control routine of FIG. 4.

FIG. 5 is a state diagram 500 illustrating one embodiment of the occupancy states of the patient support apparatus 10 as determined by the controller 310. As described above, the controller 310 determines whether or not a patient is being supported by a support surface of the mattress 30 (e.g., whether the patient is "in" or "out" the patient support apparatus 10) and updates the occupancy state accordingly. In one embodiment, the controller 310 determines two discrete states of occupancy, an occupied state 502 indicative of the patient being in the patient support apparatus 10 and an unoccupied state 506 indicative of the patient not being in the patient support apparatus 10. It should be understood that while the illustrative embodiment of FIG. 5 shows two discrete occupancy states, any number of occupancy states are contemplated by this disclosure. For example, the controller 310 may determine that the patient is both partially in and partially out of the patient support apparatus 10 (e.g., the patient is sitting on the edge of the patient support apparatus 10) at any given point of time.

Upon being powered on, the controller 310 in one embodiment, initializes the occupancy state of the patient support apparatus 10 to the unoccupied state 506. After initialization, the controller 310 updates the occupancy state of the patient support apparatus 10 to the occupied state 502 in response to determining that a normalized amount of weight on the weigh frame 56 satisfies a reference occupied threshold. For example, in one embodiment, the controller 310 updates the occupancy state of the patient support apparatus 10 to the occupied state 502 in response to determining that the normalized amount of weight on the weigh frame 56 meets or exceeds 31 pounds. In the illustrative embodiment, the controller 310 updates the occupancy state of the patient support apparatus 10 to the occupied state 502 in response to determining that the following generalized equation is true:

$$A = (\Sigma(\text{Load Cells}) - AO - AAO) \geq 31 \text{ lbs} \quad \text{Equation (4)}$$

where: $\Sigma$(Load Cells) is the sum of the amount of weight sensed by each of the load cells 68a-d; AO is the known weight on the patient support apparatus 10 at the time of manufacture (e.g., the weight of the weigh frame 56, the weight of the mattress 30, etc.); and AAO is the amount of weight placed on the weigh frame 56 not attributable to the weight of the patient or the AO. It should be understood that while the controller 310 of the illustrative embodiment of FIG. 5 updates the occupancy state of the patient support apparatus 10 to the occupied state 502 in response to determining that the normalized amount of weight on the weigh frame 56 meets or exceeds 31 pounds in other embodiments, the controller 310 may update the occupancy state to the occupied state 502 in response to determining that the normalized amount of weight on the weigh frame 56 meets or exceeds some other amount of weight.

After updating the occupancy state to the occupied state 502, the controller 310 updates the occupancy state of the patient support apparatus 10 to the unoccupied state 506 in response to determining that the normalized amount of weight on the weigh frame 56 satisfies a reference unoccupied threshold. For example, in the illustrated embodiment, the controller 310 updates the occupancy state of the patient support apparatus 10 to the unoccupied state 506 in response to determining that the normalized amount of weight on the weigh frame 56 meets or falls below 65 pounds. In the present embodiment, the controller 310 updates the occupancy state of the patient support apparatus 10 to the unoccupied state 506 in response to determining that the following generalized equation is true:

$$B = (\Sigma(\text{Load Cells}) - AO - AAO) \leq 65 \text{ lbs} \quad \text{Equation (5)}$$

where: $\Sigma$(Load Cells) is the sum of the amount of weight sensed by each of the load cells 68a-d; AO is the known weight on the patient support apparatus 10 at the time of manufacture (e.g., the weight of the weigh frame 56, the weight of the mattress 30, etc.); and AAO is the amount of weight placed on the weigh frame 56 not attributable to the weight of the patient or the AO. It should be understood that while the controller 310 of the illustrative embodiment of FIG. 5 updates the occupancy state of the patient support apparatus 10 to the unoccupied state 506 in response to determining that the normalized amount of weight on the weigh frame 56 meets or falls below 65 pounds in other embodiments, the controller 310 may also update the occupancy state to the unoccupied state 506 in response to determining that the normalized amount of weight on the weigh frame 56 meets or falls below some other amount of weight.

Figure 6:
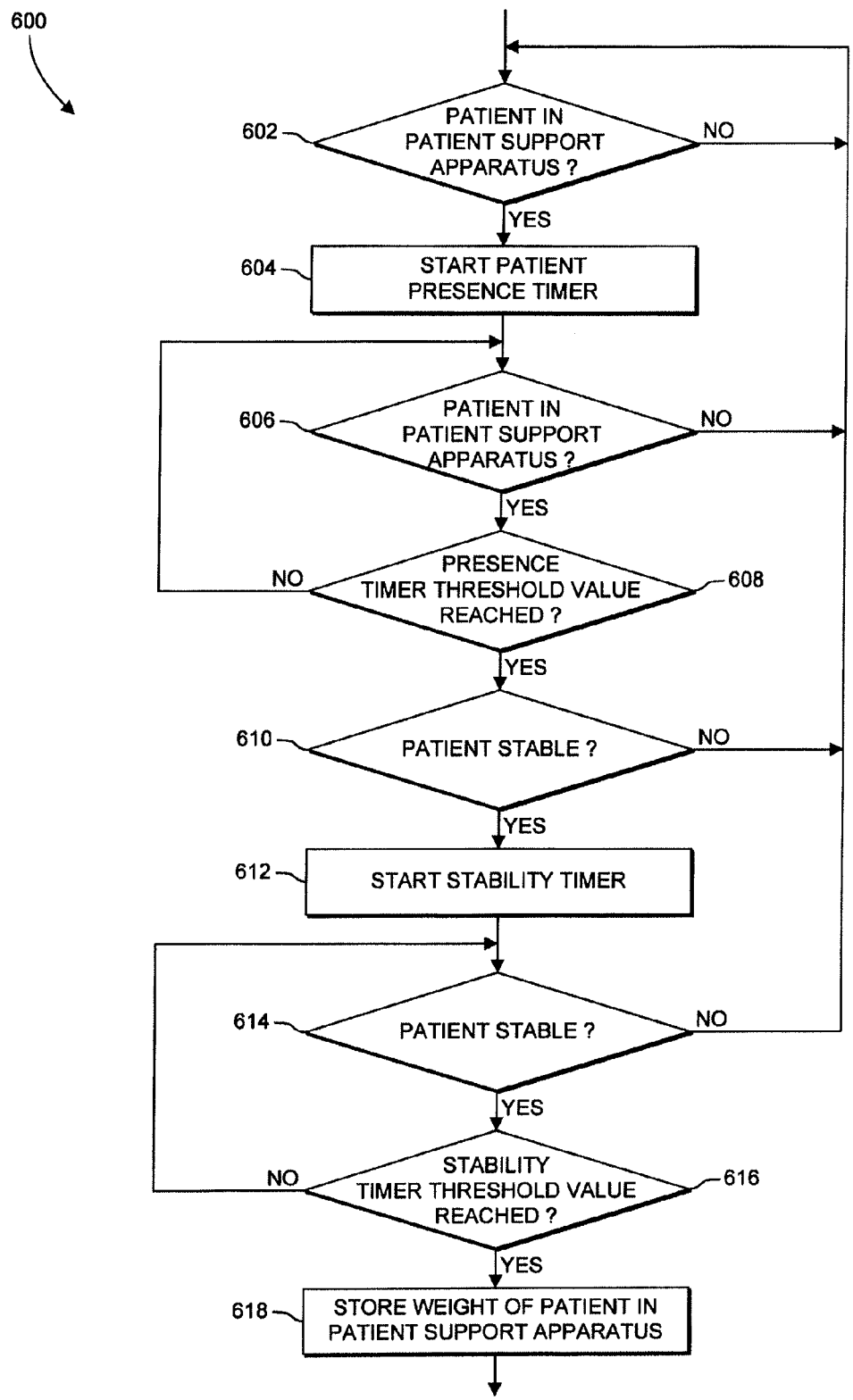
FIG. 6 is a flow chart of an illustrative control sub-routine for capturing and storing a weight of the patient being supported by the patient support apparatus that forms one part of the control routine of FIG. 4.

An illustrative software control sub-routine 600 for capturing and storing the weight of a patient in the patient support apparatus 10 is illustrated in FIG. 6 in the form of a flowchart. The software control sub-routine 600 begins at decision step 602 where the controller 310 is configured to determine whether the patient is in the patient support apparatus 10. To do so, the controller 310 checks the occupancy state of the patient support apparatus 10. If, at decision step 602, the controller 310 determines that the occupancy state of the patient support apparatus 10 corresponds to the occupied state 502, then the controller 310 determines that the patient is in the patient support apparatus 10 and the control sub-routine 600 advances to step 604. If, however, the controller 310 instead determines at decision step 602 that the occupancy state of the patient support apparatus 10 corresponds to the unoccupied state 506, then the controller 310 determines that the patient is not in the patient support apparatus 10 and the control sub-routine 600 restarts.

At step 604, the controller 310 initializes a patient presence timer in response to determining that the occupancy state of the patient support apparatus 10 corresponds to the occupied state 502. In one embodiment, the controller 310 initializes the patient presence timer in the timer module 330, which determines an amount of time that has passed since initialization. After initializing the patient presence timer, the control sub-routine 600 advances to decision step 606.

At decision step 606, the controller 310 is configured to determine whether the patient is in still the patient support apparatus 10. To do so, the controller 310 re-checks the occupancy state of the patient support apparatus 10. If, at decision step 606, the controller 310 determines that the occupancy state of the patient support apparatus 10 corresponds to the occupied state 502, then the controller 310 determines that the patient is still in the patient support apparatus 10 and the control sub-routine 600 advances to decision step 608. If, however, the controller 310 instead determines at decision step 606 that the occupancy state of the patient support apparatus 10 corresponds to the unoccupied state 506, then the controller 310 determines that the patient is no longer in the patient support apparatus 10 and the control sub-routine 600 restarts.

At decision step 608, the controller 310 determines whether a presence timer threshold value is reached. The presence timer threshold value includes a reference threshold timer value corresponding to the consecutive amount of time the patient must remain in the patient support apparatus 10 before the control sub-routine 600 advances to the next step. In one embodiment, the controller 310 determines whether the patient has been in the patient support apparatus 10 for an extended period of time such as, for example, 30 minutes. To do so, the controller 310 compares the value of the patient presence timer with the presence timer threshold value. If, at decision step 608, the controller 310 determines that the patient presence timer value has reached the presence timer threshold value, then the control sub-routine 600 advances to decision step 610. If, however, the controller 310 instead determines at decision step 608 that the patient presence timer value has not reached the presence timer threshold value, then the control sub-routine 600 returns to decision step 606 to determine whether the patient is still in the patient support apparatus 10 while the patient presence timer value continues to increment. It should be understood that although the presence timer threshold value is described in the illustrative embodiment as having a value of 30 minutes, other amounts of time may be suitable for the presence timer threshold value as contemplated by this disclosure.

At decision step 610, the controller 310 is configured to determine whether the patient is stable on the patient support apparatus 10. That is, the controller 310 is configured to determine whether the patient is moving about the patient support apparatus 10. In one embodiment, the controller 310 may compare a current load cell distribution with a reference load cell distribution to detect patient movement. Examples of utilizing a reference load cell distribution to detect patient movement can be found in U.S. Pat. No. 7,319,386, previously incorporated herein by reference. If, at decision step 610, the controller 310 detects that the patient is not moving relative to the patient support apparatus 10, then the controller 310 determines that the patient is stable and the control sub-routine 600 advances to step 612. If, however, the controller 310 at decision step 610 instead detects that the patient is moving relative to the patient support apparatus 10, then the controller 310 determines the patient is not stable and the control sub-routine 600 restarts. It should be appreciated that although patient movement is described in the illustrative embodiment as being detected as a function of comparing a current load cell distribution with a reference load cell distribution, it is contemplated that any appropriate technique for detecting patient movement may be utilized within the scope of this disclosure.

At step 612, the controller 310 initializes a stability timer in response to determining that the patient is stable (e.g., not moving relative to the patient support apparatus 10). In one embodiment, the controller 310 initializes the stability in the timer module 330, which determines an amount of time that has passed since initialization. After initializing the stability timer, the control sub-routine 600 advances to decision step 614.

At decision step 614, the controller 310 is configured to determine whether the patient is still stable. To do so, the controller 310 determines whether the patient has moved relative to the patient support apparatus 10 since the last check. That is, the controller 310 determines whether the patient is moving about the patient support apparatus 10. If, at decision step 614, the controller 310 determines that the patient has not moved relative to the patient support apparatus 10 since the last check, then the control sub-routine 600 advances to decision step 616. If, however, the controller 310 instead determines at decision step 614 that the patient has moved relative to the patient support apparatus 10 since the last check, then the control sub-routine 600 restarts.

At decision step 616, the controller 310 determines whether a stability timer threshold value is reached. The stability timer threshold value includes a reference threshold timer value corresponding to the consecutive amount of time the patient must remain stable in the patient support apparatus 10 before the control sub-routine 600 advances to the next step. In one embodiment, the controller 310 determines whether the patient has remained stable in the patient support apparatus 10 for a reference amount of time, for example, two minutes. To do so, the controller 310 compares the value of the stability timer with the stability timer threshold value. If, at decision step 616, the controller 310 determines that the stability timer value has reached the stability timer threshold value, then the control sub-routine 600 advances to step 618. If, however, the controller 310 instead determines at decision step 616 that the stability timer value has not reached the stability timer threshold value, then the control sub-routine 600 returns to decision step 614 to determine whether the patient has moved relative to the patient support apparatus 10 since the last check. It should be understood that although the stability timer threshold value is described in the illustrative embodiment as having a value of two minutes, other amounts of time may be suitable for the stability timer threshold value as contemplated by this disclosure.

At step 618, the controller 310 captures and stores the weight of the patient in the patient support apparatus 10. As discussed above, the controller 310 receives a signal from each of the load cells 68a-d and determines a total amount of weight on the weigh frame 56. The controller 310 then adjusts the total amount of weight on the weigh frame 56 by the AO and AAO to determine a total occupied patient weight (TOPW). It should be understood, however, that the TOPW may still include the weight of non-patient loads (e.g., medical equipment, personal effects, blankets, mechanical items, etc.) placed on the patient support apparatus after calculation of AAO. Therefore, TOPW may not be indicative of the true weight of the patient. After determining the TOPW, the controller 310 may save the value corresponding to the TOPW to the auxiliary memory unit 320.

Figure 7:
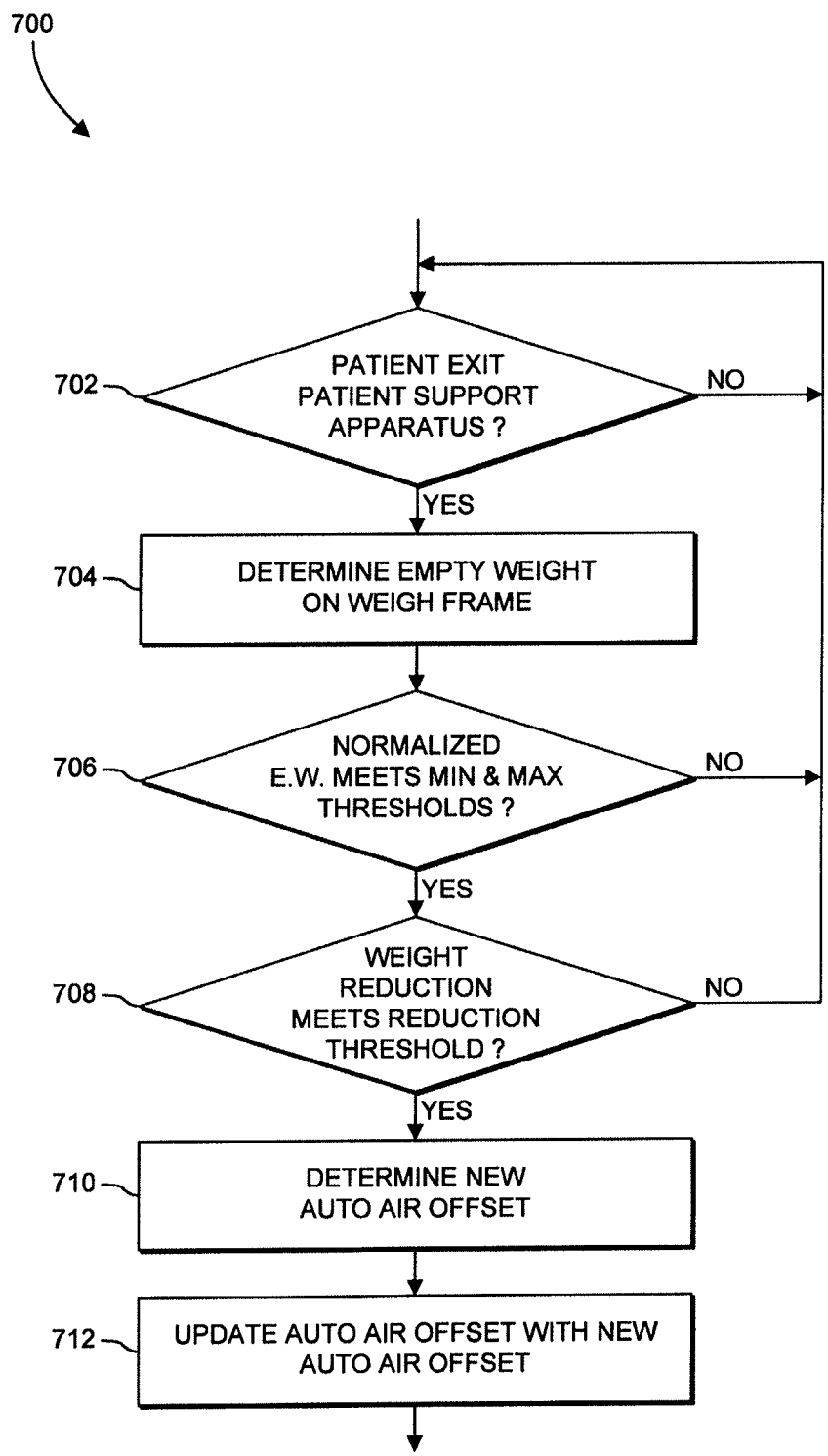
FIG. 7 is a flow chart of an illustrative control sub-routine for determining and updating an offset weight that forms one part of the control routine of FIG. 4.

An illustrative software control sub-routine 700 for updating an Auto Air Offset (AAO) value is illustrated in FIG. 7 in the form of a flowchart. The software control sub-routine 700 begins at decision step 702 where the controller 310 is configured to determine whether the patient has exited in the patient support apparatus 10. To do so, the controller 310 checks the occupancy state of the patient support apparatus 10. If, at decision step 702, the controller 310 determines that the occupancy state of the patient support apparatus 10 corresponds to the unoccupied state 506, then the controller 310 determines that the patient has exited the patient support apparatus 10 and the control sub-routine 700 advances to step 704. If, however, the controller 310 instead determines at decision step 702 that the occupancy state of the patient support apparatus 10 corresponds to the occupied state 502, then the controller 310 determines that the patient is still in the patient support apparatus 10 and the control sub-routine 700 restarts.

At step 704, the controller 310 receives a signal from each of the load cells 68a-d indicative of an amount of weight on the respective load cell. The controller 310 then determines a total amount of weight on the weigh frame 56 as a function of the signals received from each of the load cells 68a-d. That is, the controller 310 determines an empty weight of the patient support apparatus 10. In such embodiments, the empty weight (EW) is calculated by the controller 310 according to the following generalized equation:

$$EW=\Sigma(\text{Load Cells})-AO-AAO \qquad \text{Equation (6)}$$

where: $\Sigma$(Load Cells) is the sum of the amount of weight sensed by each of the load cells 68a-d after the patient exits the patient support apparatus 10; AO is the known weight on the patient support apparatus 10 at the time of manufacture (e.g., the weight of the weigh frame 56, the weight of the mattress 30, etc.); and AAO is the amount of weight placed on the weigh frame 56 not attributable to the weight of the patient or the AO. It should be understood that the AAO may not include new amounts of weight placed on the weigh frame 56 that are attributable to non-patient loads. After determining the EW, the control sub-routine 700 then advances to decision step 706.

At decision step 706, the controller 310 determines whether the empty weight on the weigh frame 56 is within a minimum and a maximum amount of weight on the weigh frame 56 at the time of manufacture. To do so, the controller 310 first normalizes the empty weight on the weigh frame 56 by the amount of weight on the weigh frame 56 at the time of manufacture. In such embodiments, the normalized empty weight (NEW) is calculated by the controller 310 according to the following generalized equation:

$$NEW = \Sigma(\text{Load Cells}) - AO \qquad \text{Equation (7)}$$

where: Σ(Load Cells) is the sum of the amount of weight sensed by each of the load cells 68*a-d* after the patient exits the patient support apparatus 10; and AO is the known weight on the weigh frame 56 at the time of manufacture (e.g., the weight of the weigh frame 56, the weight of the mattress 30, etc.). It should be understood that in one embodiment, the controller 310 does not normalize the empty weight by AAO (e.g., the amount of weight placed on the weigh frame 56 attributable to non-patient loads) when determining the NEW.

After determining the normalized empty weight (NEW) on the weigh frame 56, the controller 310 determines whether the NEW meets or is between a reference minimum weight threshold value and a reference maximum weight threshold value. In one embodiment, the controller 310 determines whether the NEW on the weigh frame 56 is: (i) greater than or equal to a reference minimum weight threshold value of −30 pounds, and (ii) less than or equal to a reference maximum weight threshold value of +30 pounds. In such embodiments, the controller 310 may determine that the NEW meets or is between the reference minimum and maximum weight threshold values according to the following generalized equation:

$$+30 \text{ lbs} \geq NEW \geq -30 \text{ lbs} \qquad \text{Equation (8)}$$

where: NEW is the normalized empty weight; −30 lbs is the reference minimum weight threshold value; and +30 lbs is the reference maximum weight threshold value. If, at decision step 706, the controller 310 determines that the normalized empty weight on the weigh frame 56 is within the minimum and maximum weight threshold values, then the control sub-routine 700 advances to decision step 708. If, however, the controller 310 instead determines at decision step 706 that the normalized empty weight on the weigh frame 56 is not within the minimum and maximum weight threshold values, then the control sub-routine 700 restarts.

At decision step 708, the controller 310 determines whether the weight on the weigh frame 56 has been reduced by a reference reduction percentage threshold between when the patient was occupying the patient support apparatus 10 and after the patient exited the patient support apparatus 10. For example, in one embodiment, the controller 310 determines whether the amount of weight on the weigh frame 56 after the patient has exited the patient support apparatus 10 represents at least a 75% reduction from the amount of weight on the weigh frame 56 when the patient was occupying the patient support apparatus 10. To do so, the controller 310 compares the empty weight (EW) of the patient support apparatus 10 with the total occupied patient weight (TOPW) to determine whether the EW represents at least a 75% reduction in weight relative to the TOPW. In such embodiments, the controller 310 may determine that the EW value represents at least a 75% percent reduction in weight relative to the TOPW according to the following generalized equation:

$$EW < \frac{TOPW}{4} \qquad \text{Equation (9)}$$

where: EW is the empty weight of the patient support apparatus 10 after the patient exits the patient support apparatus 10; and TOPW is the total occupied patient weight of the patient support apparatus 10 while the patient is in the patient support apparatus 10. It should be understood that although the reference percentage threshold is described as being 75% in the illustrative embodiment, any suitable reduction percentage thresholds are contemplated by this disclosure. If, at decision step 708, the controller 310 determines that the empty weight (EW) represents at least a 75% reduction in weight relative to the total occupied patient weight (TOPW), then the control sub-routine 700 advances to step 710. If, however, the controller 310 instead determines at decision step 708 that the EW does not represent at least a 75% reduction in weight relative to the TOPW, the control sub-routine 700 restarts.

At step 710, the controller 310 determines a new Auto Air Offset (AAO). To determine the new AAO, the controller 310 adjusts the current weight on the weigh frame 56 by subtracting the amount of weight on the weigh frame 56 at the time of manufacture. In such embodiments, the AAO is calculated by the controller 310 according to the following generalized equation:

$$AAO = \Sigma(\text{Load Cells}) - AO \qquad \text{Equation (10)}$$

where: Σ(Load Cells) is the sum of the amount of weight sensed by each of the load cells 68*a-d* after the patient exits the patient support apparatus 10; and AO is the known weight on the weigh frame 56 at the time of manufacture (e.g., the weight of the weigh frame 56, the weight of the mattress 30, etc.). As a result, the new AAO is indicative of an amount of weight attributable to new non-patient loads that have been placed on the weigh frame 56. After determining the new AAO, the control sub-routine 700 advances to step 712.

At step 712, the controller 310 updates an existing AAO value with the new AAO value. In one embodiment, the existing AAO value is stored in the auxiliary memory unit 320 (e.g., EEPROM). In such embodiments, the controller 310 first retrieves the existing AAO value from the auxiliary memory unit 320 before updating the existing AAO value with the new AAO value. It should be understood that in one embodiment, the controller 310 updates the default value for the AAO, which as described above, is a zero value. The updated AAO value may then be used to calculate the true patient weight (TPW), which compensates for new amounts of weight placed on or removed from the weigh frame 56 that are attributable to non-patient loads that have been placed on or removed from the patient support apparatus 10.

Figure 8:
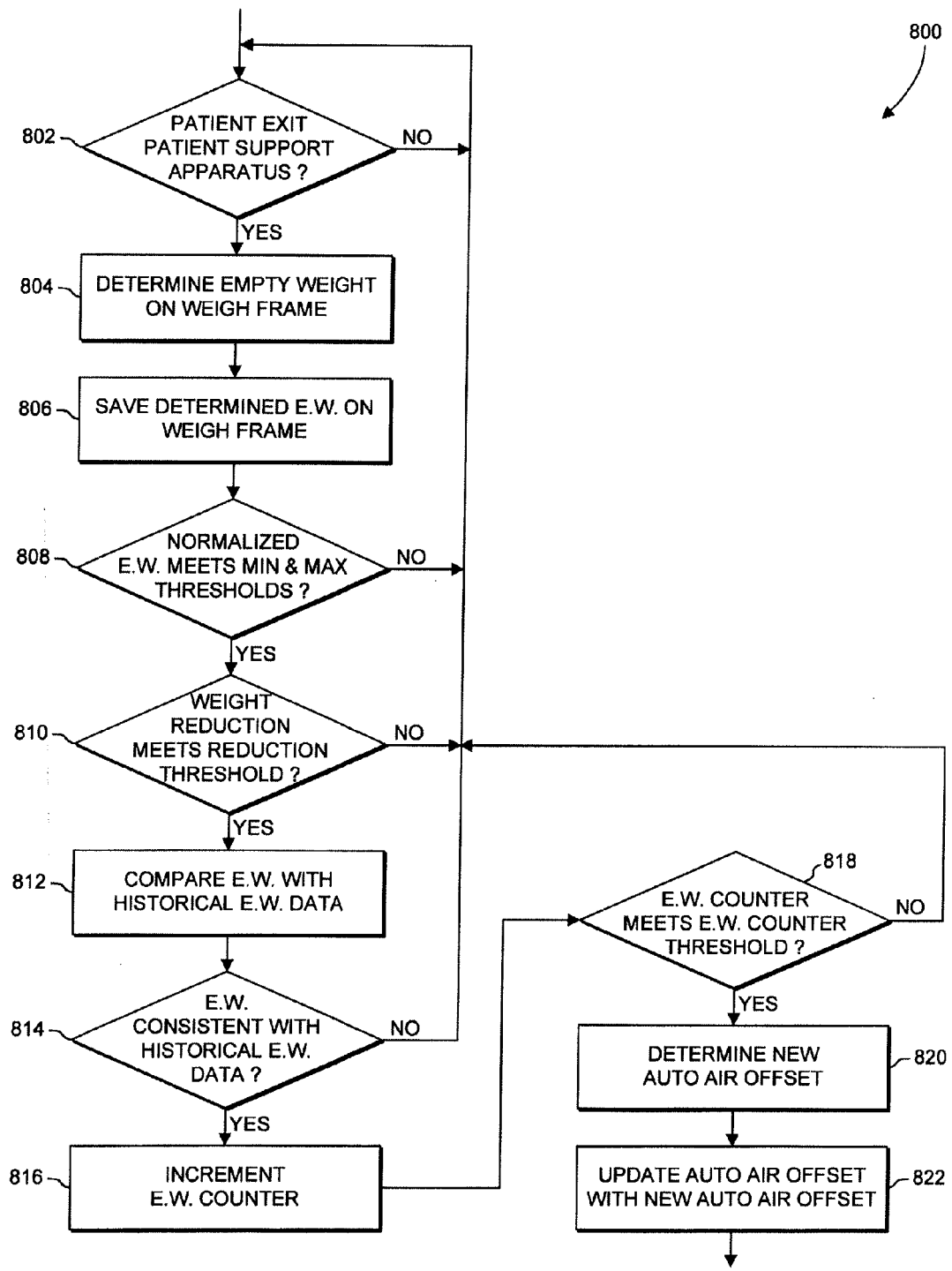
FIG. 8 is a flow chart of an illustrative control sub-routine for determining and updating an offset weight as a function of historical weight information that forms one part of the control-routine of FIG. 4.

An illustrative software control sub-routine 800 for updating an Auto Air Offset (AAO) value as a function of historical weight data is illustrated in FIG. 8 in the form of a flowchart. The software control sub-routine 800 begins at decision step 802 where the controller 310 is configured to determine whether the patient has exited in the patient support apparatus 10. To do so, the controller 310 checks the occupancy state of the patient support apparatus 10. If, at decision step 802, the controller 310 determines that the occupancy state of the patient support apparatus 10 corresponds to the unoccupied state 506, then the controller 310 determines that the patient has exited the patient support apparatus 10 and the control sub-routine 800 advances to step 804. If, however, the controller 310 instead determines at decision step 802 that the occupancy state of the patient support apparatus 10 corresponds to the occupied state 502, then the controller 310 determines that the patient is still in the patient support apparatus 10 and the control sub-routine 800 restarts.

At step 804, the controller 310 receives a signal from each of the load cells 68a-d indicative of an amount of weight on the respective load cell. The controller 310 then determines a total amount of weight on the weigh frame 56 as a function of the signals received from each of the load cells 68a-d. As such, the controller 310 determines an empty weight of the patient support apparatus 10. In such embodiments, the empty weight (EW) is calculated by the controller 310 according to the following generalized equation:

$$EW = \Sigma(\text{Load Cells}) - AO - AAO \qquad \text{Equation (11)}$$

where: $\Sigma$(Load Cells) is the sum of the amount of weight sensed by each of the load cells 68a-d after the patient exits the patient support apparatus 10; AO is the known weight on the patient support apparatus 10 at the time of manufacture (e.g., the weight of the weigh frame 56, the weight of the mattress 30, etc.); and AAO is the amount of weight placed on the weigh frame 56 not attributable to the weight of the patient or the AO. It should be understood that the AAO may not include new amounts of weight placed on the weigh frame 56 that are attributable non-patient loads. After determining the EW, control sub-routine 800 advances to step 806 in which the controller 310 saves the value corresponding to the EW to the auxiliary memory unit 320. The control sub-routine 800 then advances to decision step 808.

At decision step 808, the controller 310 determines whether the empty weight on the weigh frame 56 is within a minimum and a maximum amount of weight on the weigh frame 56 at the time of manufacture. To do so, the controller 310 first normalizes the empty weight on the weigh frame 56 by the amount of weight on the weigh frame 56 at the time of manufacture. In such embodiments, the normalized empty weight (NEW) is calculated by the controller 310 according to the following generalized equation:

$$NEW = \Sigma(\text{Load Cells}) - AO \qquad \text{Equation (12)}$$

where: $\Sigma$(Load Cells) is the sum of the amount of weight sensed by each of the load cells 68a-d after the patient exits the patient support apparatus 10; and AO is the known weight on the weigh frame 56 at the time of manufacture (e.g., the weight of the weigh frame 56, the weight of the mattress 30, etc.). It should be understood that in one embodiment, the controller 310 does not normalize the empty weight by AAO (e.g., the amount of weight placed on the weigh frame 56 attributable to non-patient loads) when determining the NEW.

After determining the normalized empty weight (NEW) on the weigh frame 56, the controller 310 determines whether the NEW meets or is between a reference minimum weight threshold value and a reference maximum weight threshold value. In one embodiment, the controller 310 determines whether the NEW on the weigh frame 56 is: (i) greater than or equal to a reference minimum weight threshold value of −30 pounds, and (ii) less than or equal to a reference maximum weight threshold value of +30 pounds. In such embodiments, the controller 310 may determine that the NEW meets or is between the reference minimum and maximum weight threshold values according to the following generalized equation:

$$+30 \text{ lbs} \geq NEW \geq -30 \text{ lbs} \qquad \text{Equation (13)}$$

where: NEW is the normalized empty weight; −30 lbs is the reference minimum weight threshold value; and +30 lbs is the reference maximum weight threshold value. If, at decision step 808, the controller 310 determines that the normalized empty weight on the weigh frame 56 is within the minimum and maximum weight threshold values, then the control sub-routine 800 advances to decision step 810. If, however, the controller 310 instead determines at decision step 808 that the normalized empty weight on the weigh frame 56 is not within the minimum and maximum weight threshold values, then the control sub-routine 800 restarts.

At decision step 810, the controller 310 determines whether the weight on the weigh frame 56 has been reduced by a reference reduction percentage threshold between when the patient was occupying the patient support apparatus 10 and after the patient exited the patient support apparatus 10. For example, in one embodiment, the controller 310 determines whether the amount of weight on the weigh frame 56 after the patient has exited the patient support apparatus 10 represents at least a 75% reduction from the amount of weight on the weigh frame 56 when the patient was occupying the patient support apparatus 10. To do so, the controller 310 compares the empty weight (EW) of the patient support apparatus 10 with the total occupied patient weight (TOPW) to determine whether the EW represents at least a 75% reduction in weight relative to the TOPW. In such embodiments, the controller 310 may determine that the EW value represents at least a 75% percent reduction in weight relative to the TOPW according to the following generalized equation:

$$EW < \frac{TOPW}{4} \qquad \text{Equation (14)}$$

where: EW is the empty weight of the patient support apparatus 10 after the patient exits the patient support apparatus 10; and TOPW is the total occupied patient weight of the patient support apparatus 10 while the patient is in the patient support apparatus 10. It should be understood that although the reference percentage threshold is described as being 75% in the illustrative embodiment, any suitable reduction percentage thresholds are contemplated by this disclosure. If, at decision step 810, the controller 310 determines that the empty weight (EW) represents at least a 75% reduction in weight relative to the total occupied patient weight (TOPW), then the control sub-routine 800 advances to step 812. If, however, the controller 310 instead determines at decision step 810 that the EW does not represent at least a 75% reduction in weight relative to the TOPW, then the control sub-routine 800 restarts.

At step 812, the controller 310 compares the determined empty weight (EW) with historical EW data. In one embodiment, the historical EW data is stored in the auxiliary memory unit 320 (e.g., EEPROM). In such embodiments, the controller 310 first retrieves the historical EW data from the auxiliary memory unit 320 before comparing the determined EW this historical EW data. The control sub-routine 800 then advances to decision step 814.

At decision step 814, the controller 310 determines whether the EW is consistent with the historical EW data. In one embodiment, the controller 310 determines that the EW is consistent with the historical EW data in response to determining that the EW is substantially similar to the historical EW data. It should be appreciated, however, that the controller 310 may, in other embodiments, determine that the EW is consistent with the historical EW data in response to determining that the EW meets some other criteria with respect to the historical EW data. For example, in one embodiment, the controller may determine that the EW is consistent with the historical EW data in response to determining that the EW is within a reference threshold value of the historical EW data. If, at decision step 814, the controller 310 determines that the EW is consistent with the historical EW data, then the control sub-routine 800 advances to step 816. If, however, the controller 310 determines at decision step 814 that the EW is not consistent with the historical EW data, then the control sub-routine 800 restarts.

At step 816, the controller 310 increments an empty weight counter. The empty weight counter tracks a number of occurrences that the controller 310 determines the EW to be consistent with the historical EW data. After incrementing the empty weight counter, the control sub-routine 800 advances to decision step 818.

At decision step 818, the controller 310 determines whether an empty weight counter threshold value is reached. The empty weight counter threshold value includes a reference counter threshold value corresponding to the number of times the EW must be consistent with the historical EW data before the control sub-routine 800 advances to the next step. It should be understood that the empty weight counter threshold can be configured with any value to facilitate the detection of weight trends by the controller 310. If, at decision step 818, the controller 310 determines that empty weight counter threshold value has been reached, then the control sub-routine 800 advances to step 820. If, however, the controller 310 determines instead at decision step 818 that the empty weight counter threshold value has not been reached, then the control sub-routine 800 restarts.

At step 820, the controller 310 determines a new Auto Air Offset (AAO). To determine the new AAO, the controller 310 adjusts the current weight on the weigh frame 56 by subtracting the amount of weight on the weigh frame 56 at the time of manufacture. In such embodiments, the AAO is calculated by the controller 310 according to the following generalized equation:

$$AAO = \Sigma(\text{Load Cells}) - AO \qquad \text{Equation (15)}$$

where: $\Sigma$(Load Cells) is the sum of the amount of weight sensed by each of the load cells 68a-d after the patient exits the patient support apparatus 10; and AO is the known weight on the weigh frame 56 at the time of manufacture (e.g., the weight of the weigh frame 56, the weight of the mattress 30, etc.). As a result, the new AAO is indicative of an amount of weight attributable to new non-patient loads that have been placed on the weigh frame 56. After determining the new AAO, the control sub-routine 800 advances to step 822.

At step 822, the controller 310 updates an existing AAO value with the new AAO value. In one embodiment, the existing AAO value is stored in the auxiliary memory unit 320 (e.g., EEPROM). In such embodiments, the controller 310 first retrieves the existing AAO value from the auxiliary memory unit 320 before updating the existing AAO value with the new AAO value. It should be understood that in one embodiment, the controller 310 updates the default value for the AAO, which as described above, is a zero value. The updated AAO value may then be used to calculate the true patient weight (TPW), which compensates for new amounts of weight placed on or removed from the weigh frame 56 that are attributable to non-patient loads that have been placed on or removed from the patient support apparatus 10.

The invention claimed is:

1. A patient support apparatus comprising:
a patient support;
a plurality of load cells supporting the patient support, each load cell configured to produce a signal indicative of an amount of weight on that load cell; and
a controller in communication with the plurality of load cells configured to:
receive the signal produced by each of the plurality of load cells;
determine whether the patient support is supporting a patient as a function of the signals produced by the plurality of load cells;
detect movement on the patient support in response to determining that the patient support is supporting the patient;
determine a weight of the patient being supported on the patient support,
determine, subsequent to determining the weight of the patient, whether the patient support is no longer supporting the patient,
determine, in response to determining that the patient support is no longer supporting the patient, an empty weight of the patient support apparatus as a function of signals received from the plurality of load sensors;
determine whether a normalized empty weight of the patient support apparatus is at least one of greater than or equal to a reference minimum weight threshold;
determine whether the normalized empty weight is at least one of less than or equal to a reference maximum weight threshold;
determine whether the empty weight is less than the weight of the patient reduced by a reference reduction percentage;
determine whether historical empty weight data is stored in memory of the patient support apparatus;
store the empty weight in the memory of the patient support apparatus;
compare the empty weight to the historical empty weight data in response to determining that historical empty weight data is stored in the memory;
determine whether the empty weight is consistent with the historical empty weight data;
increment an empty weight counter in response to determining that the empty weight is consistent with the historical empty weight data;
determine whether a current empty weight counter value is at least one of greater than or equal to an empty weight counter threshold; and
update a weight offset in response to determining that the patient support is no longer supporting the patient, wherein to update a weight offset in response to determining that the patient support is no longer supporting the patient comprises updating the weight offset in response to determining that the current empty weight counter value is at least one of greater than or equal to the empty weight counter threshold.

2. The patient support apparatus of claim 1, wherein to determine whether the patient support is supporting the patient comprises determining a current occupancy state of the patient support apparatus.

3. The patient support apparatus of claim 2, wherein the current occupancy state of the patient support apparatus comprises at least one of an occupied state and an unoccupied state, the occupied state being indicated when the patient support is determined to be supporting the patient and the unoccupied state being indicated when the patient support is determined not to be supporting the patient.

4. The patient support apparatus of claim 3, wherein the controller is further configured to:
- set an initial occupancy state of the patient support apparatus to the unoccupied state;
- determine a normalized amount of weight on the plurality of load cells as a function of the signals produced by the plurality of load cells;
- set the current occupancy state of the patient support apparatus to the occupied state in response to the normalized amount of weight on the plurality of load cells satisfying an occupied condition, the occupied condition defining a first normalized threshold value for which the normalized amount of weight on the plurality of load cells must exceed; and
- set the current occupancy state of the patient support apparatus to the unoccupied state in response to the normalized amount of weight on the plurality of load cells satisfying an unoccupied condition, the unoccupied condition defining a second normalized threshold value for which the normalized amount of weight on the plurality of load cells must be below.

5. The patient support apparatus of claim 4, wherein the first normalized threshold value is 31 pounds and the second normalized threshold value is 65 pounds.

6. The patient support apparatus of claim 4, wherein the normalized amount of weight on the plurality of load cells comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus.

7. The patient support apparatus of claim 1, further comprising a timer module in communication with the controller, the timer module is configured to increment one or more timer values for the controller.

8. The patient support apparatus of claim 7, wherein the controller is further configured to:
- start a patient presence timer in response to determining that the patient support is supporting the patient;
- determine whether a current value of the patient presence timer is at least one of greater than or equal to a reference presence timer threshold;
- start a stability timer in response to (i) determining that the current value of the patient presence timer is at least one of greater than or equal to the reference presence timer threshold, and (ii) not detecting movement on the patient support;
- determine whether a current value of the stability timer is at least one of greater than or equal to a reference stability timer threshold; and
- store the weight of the patient being supported on the patient support in a memory.

9. The patient support apparatus of claim 8, wherein the reference presence timer threshold is 30 minutes and the reference stability timer threshold is 2 minutes.

10. The patient support apparatus of claim 1, wherein the empty weight of the patient support apparatus comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus, and wherein the normalized empty weight of the patient support apparatus comprises the current total amount of weight on the plurality of load cells being compensated only for the first amount of weight.

11. The patient support apparatus of claim 1, wherein the reference minimum weight threshold is minus 30 pounds, the reference maximum weight threshold is plus 30 pounds, and the reference reduction percentage is 75 percent.

12. The patient support apparatus of claim 1, wherein to update a weight offset in response to determining that the patient support is no longer supporting the patient comprises updating the weight offset in response to (i) determining that historical empty weight data is not stored in the memory, (ii) determining that the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

13. A method for determining a weight offset comprising:
- receiving, on a controller of a patient support apparatus, a signal produced by each of a plurality of load cells supporting a patient support, the signal produced by each load cell indicating an amount of weight on that load cell;
- determining, on the controller, whether the patient support of the patient support apparatus is supporting a patient as a function of the signals produced by the plurality of load cells;
- detecting, on the controller, movement on the patient support in response to determining that the patient support is supporting the patient;
- determining, on the controller, a weight of the patient being supported on the patient support;
- determining, on the controller, subsequent to determining the weight of the patient, whether the patient support is no longer supporting the patient;
- determining, on the controller, an empty weight of the patient support apparatus as a function of signals received from the plurality of load sensors in response to determining that the patient support is no longer supporting the patient;
- determining, on the controller, whether a normalized empty weight of the patient support apparatus is at least one of greater than or equal to a reference minimum weight threshold;
- determining, on the controller, whether the normalized empty weight is at least one of less than or equal to a reference maximum weight threshold;
- determining, on the controller, whether the empty weight is less than the weight of the patient reduced by a reference reduction percentage;
- determining, on the controller, whether historical empty weight data is stored in memory of the patient support apparatus;
- storing the empty weight in the memory of the patient support apparatus;
- comparing, on the controller, the empty weight to the historical empty weight data in response to determining that historical empty weight data is stored in the memory;
- determining, on the controller, whether the empty weight is consistent with the historical empty weight data;

incrementing, on the controller, an empty weight counter in response to determining that the empty weight is consistent with the historical empty weight data;

determining, on the controller, whether a current empty weight counter value is at least one of greater than or equal to an empty weight counter threshold, and updating, on the controller, a weight offset in response to determining that the patient support is no longer supporting the patient, wherein updating a weight offset in response to determining that the patient support is no longer supporting the patient comprises updating the weight offset in response to determining that the current empty weight counter value is at least one of greater than or equal to the empty weight counter threshold.

14. The method of claim 13, wherein determining whether the patient support of the patient support apparatus is supporting the patient comprises determining a current occupancy state of the patient support apparatus, the current occupancy state of the patient support apparatus comprises at least one of an occupied state and an unoccupied state, the occupied state being indicated when the patient support is determined to be supporting the patient and the unoccupied state being indicated when the patient support is determined not to be supporting the patient.

15. The method of claim 14, further comprising:
setting, on the controller, an initial occupancy state of the patient support apparatus to the unoccupied state;
determining, on the controller, a normalized amount of weight on the plurality of load cells as a function of the signals produced by the plurality of load cells;
setting, on the controller, the current occupancy state of the patient support apparatus to the occupied state in response to the normalized amount of weight on the plurality of load cells satisfying an occupied condition, the occupied condition defining a first normalized threshold value for which the normalized amount of weight on the plurality of load cells must exceed; and
setting, on the controller, the current occupancy state of the patient support apparatus to the unoccupied state in response to the normalized amount of weight on the plurality of load cells satisfying an unoccupied condition, the unoccupied condition defining a second normalized threshold value for which the normalized amount of weight on the plurality of load cells must be below.

16. The method of claim 15, wherein the normalized amount of weight on the plurality of load cells comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus.

17. The method of claim 13, further comprising:
starting, on the controller, a patient presence timer in response to determining that the patient support is supporting the patient;
determining, on the controller, whether a current value of the patient presence timer is at least one of greater than or equal to a reference presence timer threshold;
starting, on the controller, a stability timer in response to (i) determining that the current value of the patient presence timer is at least one of greater than or equal to the reference presence timer threshold, and (ii) not detecting movement on the patient support;

determining, on the controller, whether a current value of the stability timer is at least one of greater than or equal to a reference stability timer threshold; and storing the weight of the patient being supported on the patient support in a memory.

18. The method of claim 13, wherein the empty weight of the patient support apparatus comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus, and wherein the normalized empty weight of the patient support apparatus comprises the current total amount of weight on the plurality of load cells being compensated only for the first amount of weight.

19. The method of claim 13, wherein updating a weight offset in response to determining that the patient support is no longer supporting the patient comprises updating the weight offset in response to (i) determining that historical empty weight data is not stored in the memory; (ii) determining that the first frame of the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

20. A patient support apparatus comprising:
a processor; and
at least one machine-readable storage medium comprising a plurality of instructions, that in response to being executed by the processor, result in the patient support apparatus:
receiving, a signal produced by each of a plurality of load cells supporting a patient support of the patient support apparatus, the signal produced by each load cell indicating an amount of weight on that load cell;
determining whether the patient support of the patient support apparatus is supporting a patient as a function of the signals produced by the plurality of load cells;
detecting movement on the patient support in response to determining that the patient support is supporting the patient;
determining a weight of the patient being supported on the patient support,
determining, subsequent to determining the weight of the patient, whether the patient support is no longer supporting the patient;
determining an empty weight of the patient support apparatus as a function of signals received from the plurality of load sensors in response to determining that the patient support is no longer supporting the patient;
determining whether a normalized empty weight of the patient support apparatus is at least one of greater than or equal to a reference minimum weight threshold;
determining whether the normalized empty weight is at least one of less than or equal to a reference maximum weight threshold;
determining whether the empty weight is less than the weight of the patient reduced by a reference reduction percentage;

determining whether historical empty weight data is stored in memory of the patient support apparatus;

storing the empty weight in the memory of the patient support apparatus;

comparing the empty weight to the historical empty weight data in response to determining that historical empty weight data is stored in the memory;

determining whether the empty weight is consistent with the historical empty weight data;

incrementing an empty weight counter in response to determining that the empty weight is consistent with the historical empty weight data;

determining whether a current empty weight counter value is at least one of greater than or equal to an empty weight counter threshold; and updating a weight offset in response to determining that the patient support is no longer supporting the patient, wherein updating a weight offset in response to determining that the patient support is no longer supporting the patient comprises updating the weight offset in response to determining that the current empty weight counter value is at least one of greater than or equal to the empty weight counter threshold.

21. The patient support apparatus of claim 20, wherein determining whether the patient support of the patient support apparatus is supporting the patient comprises determining a current occupancy state of the patient support apparatus, the current occupancy state of the patient support apparatus comprises at least one of an occupied state and an unoccupied state, the occupied state being indicated when the patient support is determined to be supporting the patient and the unoccupied state being indicated when the patient support is determined not to be supporting the patient.

22. The patient support apparatus of claim 20, wherein the at least one machine-readable storage medium further comprises instructions, that in response to being executed by the processor, result in the patient support apparatus:

starting a patient presence timer in response to determining that the patient support is supporting the patient;

determining whether a current value of the patient presence timer is at least one of greater than or equal to a reference presence timer threshold;

starting a stability timer in response to (i) determining that the current value of the patient presence timer is at least one of greater than or equal to the reference presence timer threshold, and (ii) not detecting movement on the patient support;

determining whether a current value of the stability timer is at least one of greater than or equal to a reference stability timer threshold; and storing the weight of the patient being supported on the patient support in a memory.

23. The patient support apparatus of claim 20, wherein updating a weight offset in response to determining that the patient support is no longer supporting the patient comprises updating the weight offset in response to (i) determining that historical empty weight data is not stored in the memory; (ii) determining that the patient support is no longer supporting the patient, (iii) determining that the normalized empty weight is at least one of greater than or equal to the reference minimum weight threshold, (iv) determining that the normalized empty weight is at least one of less than or equal to the reference maximum weight threshold, and (v) determining that the empty weight is less than the weight of the patient reduced by the reference reduction percentage.

24. A patient support apparatus comprising:

a patient support;

a plurality of load cells supporting the patient support, each load cell configured to produce a signal indicative of an amount of weight on that load cell; and a controller in communication with the plurality of load cells configured to:

receive the signal produced by each of the plurality of load cells;

determine whether the patient support is supporting a patient as a function of the signals produced by the plurality of load cells;

determine, in response to determining that the patient support is no longer supporting the patient, an empty weight of the patient support apparatus as a function of signals received from the plurality of load sensors;

increment an empty weight counter in response to determining that the empty weight is consistent with historical empty weight data;

determine whether a current empty weight counter value is at least one of greater than or equal to an empty weight counter threshold; and update a weight offset in response to determining that the patient support is no longer supporting the patient, wherein to update a weight offset in response to determining that the patient support is no longer supporting the patient comprises updating the weight offset in response to determining that the current empty weight counter value is at least one of greater than or equal to the empty weight counter threshold.

25. The patient support apparatus of claim 24, wherein the controller is further configured to:

detect movement on the patient support in response to determining that the patient support is supporting the patient, determine a weight of the patient being supported on the patient support, determine, subsequent to determining the weight of the patient, whether the patient support is no longer supporting the patient, and update the weight offset in response to determining that the patient support is no longer supporting the patient.

26. The patient support apparatus of claim 25, wherein to determine whether the patient support is supporting the patient comprises determining a current occupancy state of the patient support apparatus.

27. The patient support apparatus of claim 26, wherein the current occupancy state of the patient support apparatus comprises at least one of an occupied state and an unoccupied state, the occupied state being indicated when the patient support is determined to be supporting the patient and the unoccupied state being indicated when the patient support is determined not to be supporting the patient.

28. The patient support apparatus of claim 27, wherein the controller is further configured to:

set an initial occupancy state of the patient support apparatus to the unoccupied state;

determine a normalized amount of weight on the plurality of load cells as a function of the signals produced by the plurality of load cells;

set the current occupancy state of the patient support apparatus to the occupied state in response to the normalized amount of weight on the plurality of load cells satisfying an occupied condition, the occupied condition defining a first normalized threshold value for which the normalized amount of weight on the plurality of load cells must exceed; and set the current occupancy state of the patient support apparatus to the unoccupied state in response to the normalized amount of weight on the plurality of load cells satisfying an unoccupied condition, the unoccupied condition defining a second normalized threshold value for which the normalized amount of weight on the plurality of load cells must be below.

29. The patient support apparatus of claim 28, wherein the first normalized threshold value is 31 pounds and the second normalized threshold value is 65 pounds.

30. The patient support apparatus of claim 28, wherein the normalized amount of weight on the plurality of load cells comprises a current total amount of weight on the plurality of load cells being compensated for a first amount of weight and a second amount of weight, the first amount of weight corresponding to the weight of the patient support apparatus at the time of manufacture, and the second amount of weight corresponding to the weight of non-patient items placed on the patient support apparatus.

31. The patient support apparatus of claim 24, wherein the controller is further configured to:
   determine whether a normalized empty weight of the patient support apparatus is at least one of greater than or equal to a reference minimum weight threshold;
   determine whether the normalized empty weight is at least one of less than or equal to a reference maximum weight threshold;
   determine whether the empty weight is less than the weight of the patient reduced by a reference reduction percentage; and
   determine whether the historical empty weight data is stored in memory of the patient support apparatus.

* * * * *